(12) United States Patent
Nishida et al.

(10) Patent No.: US 6,788,458 B2
(45) Date of Patent: Sep. 7, 2004

(54) MICROSCOPE STAGE

(75) Inventors: Masaaki Nishida, Komagane (JP); Kenichi Yamagishi, Ina (JP); Takashi Nagano, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/389,736

(22) Filed: Mar. 14, 2003

(65) Prior Publication Data

US 2003/0169492 A1 Sep. 11, 2003

Related U.S. Application Data

(62) Division of application No. 10/056,311, filed on Jan. 23, 2002, now Pat. No. 6,563,635, which is a division of application No. 09/439,430, filed on Nov. 15, 1999, now Pat. No. 6,369,940.

(30) Foreign Application Priority Data

Nov. 16, 1998 (JP) .......................................... 10-325316
Sep. 30, 1999 (JP) .......................................... 11-280617
Nov. 10, 1999 (JP) .......................................... 11-319116

(51) Int. Cl.[7] ............................................. G02B 21/26
(52) U.S. Cl. ..................... 359/393; 359/391; 74/490.13
(58) Field of Search ................................. 359/391, 393; 74/490.13, 89.22

(56) References Cited

U.S. PATENT DOCUMENTS 5,802,925 A   9/1998   Kanao
6,018,415 A   1/2000   Woo et al.

FOREIGN PATENT DOCUMENTS

DE   22 60 91 A     8/1985
JP   1-219814 A     9/1989
JP   6-222278 A     8/1994
JP   8-304708       11/1996

Primary Examiner—Mark A. Robinson
Assistant Examiner—Lee Fineman
(74) Attorney, Agent, or Firm—Frishauf, Holtz, Goodman & Chick, P.C.

(57) ABSTRACT

A microscope stage of this invention includes an upper stage, a handle shaft rotatably supported on the upper stage, a pulley rotatably supported on the upper stage in a position different from the handle shaft, a lower stage directly driven and guided with respect to the upper stage and a transmission member for interlocking the handle shaft, pulley and lower stage.

7 Claims, 23 Drawing Sheets

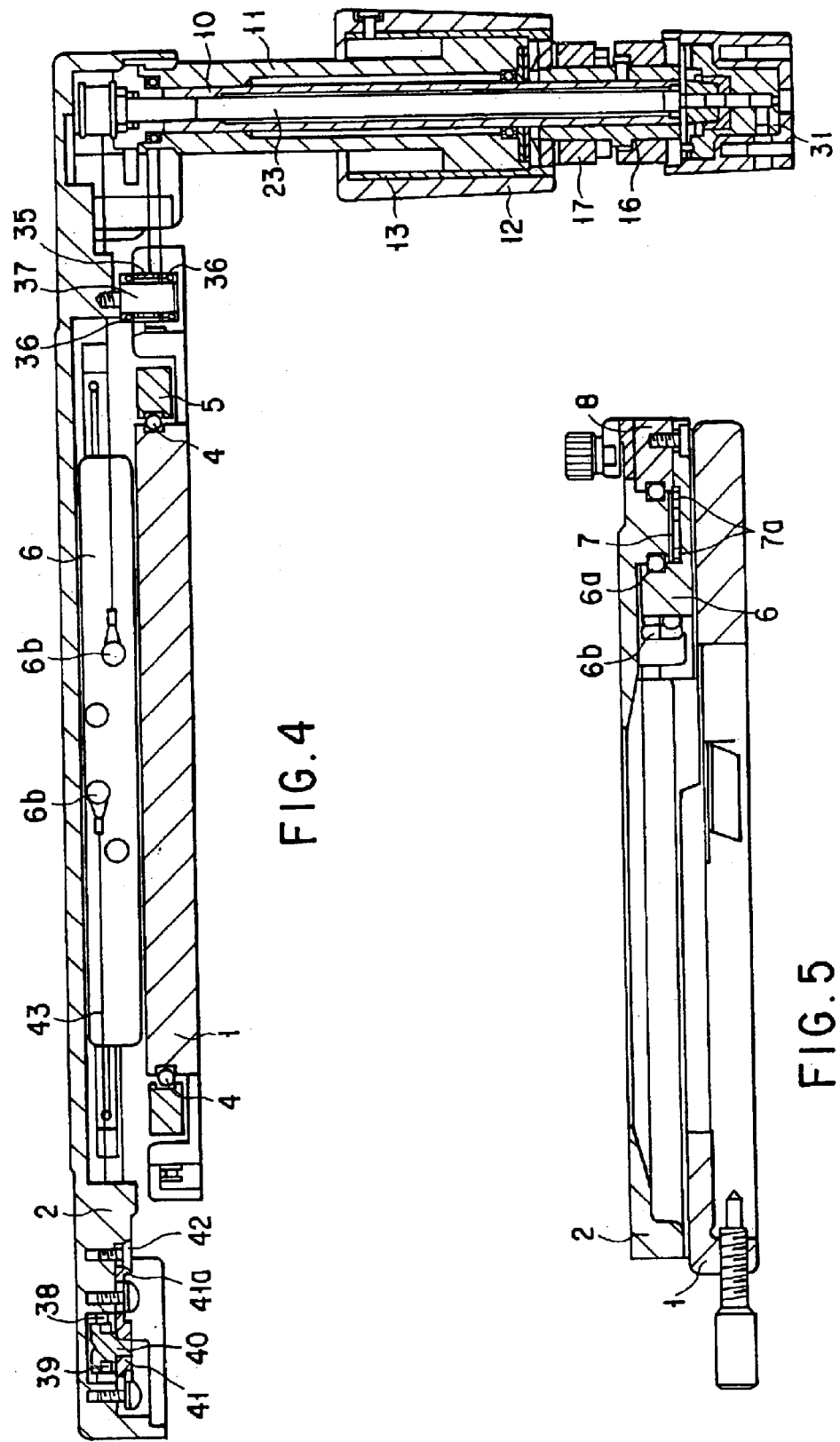

MICROSCOPE STAGE

This is a division of application Ser. No. 10,056,311 filed on Jan. 23, 2002, now U.S. Pat. No. 6,563,635 which is a division of application Ser. No. 09/439,430 filed on Nov. 15, 1999, now U.S. Pat. No. 6,369,940 issued on Apr. 9, 2002.

BACKGROUND OF THE INVENTION

This invention relates to a microscope stage.

The schematic construction of a stage of the conventional microscope includes a lower stage fixed on the microscope main body, an upper stage directly driven and guided with respect to the lower stage by a mechanism such as a ball guide, roller guide, shaft guide and a stage clip holding member directly driven and guided with respect to the upper stage in a direction perpendicular to the directly driving and guiding direction by the same mechanism. By causing a sample holder (stage clip) fixed on the stage clip holding member to be guided in two directions, a sample held by the sample holder can be moved on a plane relatively to the lower stage.

Further, in a driving system, an operating handle is disposed on one side of two coaxial shafts which are rotatably mounted on the upper stage and a transmission mechanism such as a rack and pinion, wire and pulley or belt and pulley is disposed on the opposite side. When the operating handle is operated to be rotated, the upper stage and stage clip holding member are directly driven and guided by the transmission mechanism and the relative movement in the plane of the sample holder with respect to the lower stage can be attained.

In Jap. Pat. Appln. KOKAI Publication No. 8-304708, a microscope stage which is featured in that the upper stage is driven by use of a wire is disclosed. In this construction, one end of the wire is attached to a pin planted on the lower stage and the other end thereof is attached to one end of an extension spring. The other end of the extension spring is attached to a pin which is planted on the lower stage and different from the former pin. A wire is wound by one turn on a pulley rotatably mounted on the upper stage. If the pulley is rotated by use of the handle, it is rotated by extension force of the extension spring without causing any slip with respect to the wire and the pulley is moved in a Y direction with the wire wound thereon. Since the pulley is attached to the upper stage, the upper stage also moves in the Y direction according to the movement of the pulley.

In recent years, as importance is attached to the operability of the microscope, the importance of the positions of an operating portion (for example, focusing handle) of the microscope arranged around the stage and a sample moving/operating handle (stage operating handle) which is frequently used at the time of microscopic examination is increased.

However, in the above-described conventional wire-driven stage, since the pulley disposed coaxially with the stage operating handle must be arranged to be set in contact with the wire rope stretched along the stage movement direction, there occurs a problem that the degree of freedom of the arrangement of the stage operating handle is limited.

Further, the requirements of the users for the recent microscope stage are diversified, and particularly, it is desired to rotate the stage operating handle which the user most often operates with slight and less force and make the variable range thereof wide. On the other hand, as the basic performance of the stage, the precision of stoppage for stopping a sample at a target position is desired. That is, it is important that the position of the sample is not changed when the operator operates the handle to position the sample and releases his hold.

BRIEF SUMMARY OF THE INVENTION

An object of this invention is to provide a microscope stage which has a simple construction using inexpensive members and in which attainment of high alignment precision, preferable movement follow-up property, operation feeling as the microscope stage and enhancement of the degree of freedom of the arrangement of the stage operating handle can be made compatible.

A microscope stage of this invention comprises an upper stage, a handle shaft rotatably supported on the upper stage, a pulley rotatably supported on the upper stage in a position different from the handle shaft, a lower stage directly driven and guided with respect to the upper stage and a transmission member for interlocking the handle shaft, pulley and lower stage.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a front cross sectional view of a handle mechanism portion of the microscope stage according to the first embodiment of this invention.

FIG. 5 is a side cross sectional view of the microscope stage according to the first embodiment of this invention.

DETAILED DESCRIPTION OF THE INVENTION

Figure 1:
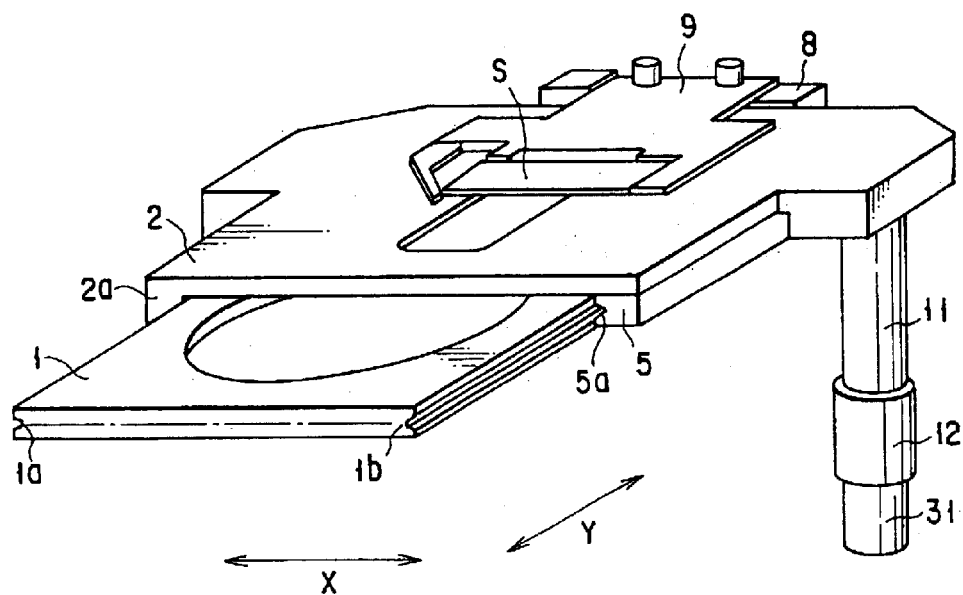
FIG. 1 is a perspective view showing the construction of a microscope stage according to a first embodiment of this invention.
Figure 2:
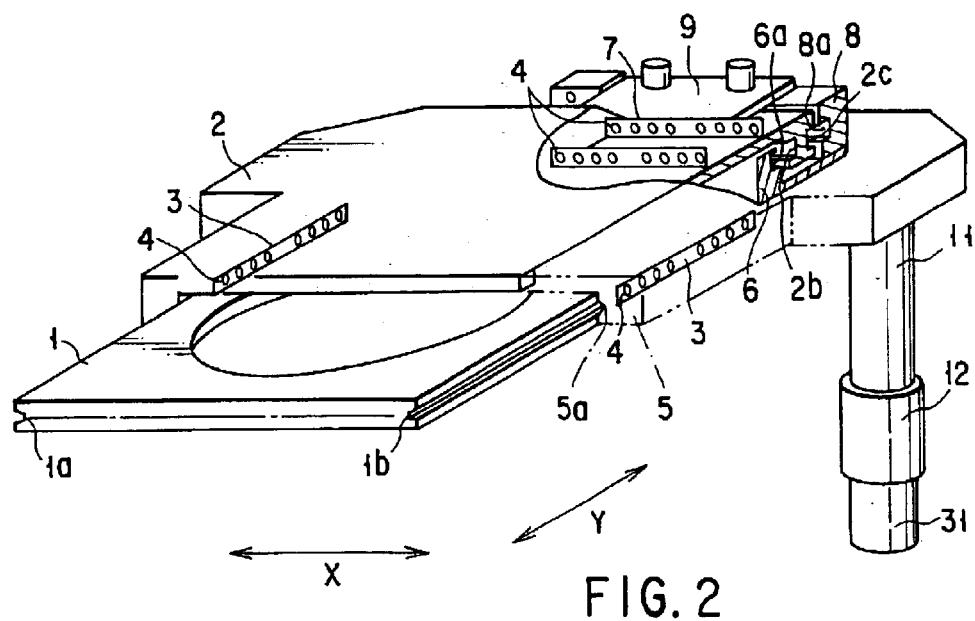
FIG. 2 is a partial cross sectional view showing the construction of the microscope stage according to the first embodiment of this invention.

FIGS. 1 and 2 are views showing the construction of a microscope stage according to a first embodiment of this invention, FIG. 1 is a perspective view and FIG. 2 is a partial cross sectional view. A lower stage 1 shown in FIGS. 1 and 2 is mounted on a microscope main body (not shown). Guide groove portions 1a, 1b for constructing a guide mechanism by balls (or a guide mechanism by rollers) are formed in the right and left side surfaces of the lower stage 1. Further, an upper stage 2 is arranged on the lower stage 1. A guide groove portion 2a is formed in the upper stage 2 and the guide groove portion 2a is set to face the guide groove portion 1a which is one of the guide groove portions formed in the lower stage 1. A large number of balls 4 the interval between which is always kept constant and which are not shown in the drawing are inserted between the facing guide groove portions 1a and 2a via a casing 3 so as to rotate between the guide groove portions 1a and 2a.

Further, a guide member 5 is disposed on the upper stage 2 and a guide groove portion 5a is formed in the guide member 5. The guide groove portion 5a faces the other guide groove portion 1b formed in the lower stage 1. Like the case described before, a large number of balls 4 the interval between which is always kept constant are inserted between the facing guide groove portions 1b and 5a via a casing 3 so as to rotate between the guide groove portions 1b and 5a. As a result, the upper stage 2 is supported to be relatively movable in a guide groove direction (Y direction) with respect to the lower stage 1 fixed on the microscope main body.

On the other hand, guide groove portions 2b and 2c are formed in the upper stage 2 in a direction (X direction) perpendicular to the Y direction. A guide member 6 and stage clip holding member 8 which are integrally fixed are disposed in opposition to the guide groove portions 2b and 2c of the upper stage 2. A guide groove portion 6a is formed in the guide member 6. The guide groove portion 6a faces the guide groove portion 2b. A "⊐"-shaped casing 7 is disposed between the facing guide groove portions 2b and 6a such that it will bridge the grooves 2b, 2c. Further, like the case described before, a large number of balls 4 the interval between which is always kept constant are inserted via the casing 7 so as to rotate between the facing guide groove portions 2b and 6a.

A guide groove portion 8a is formed in the stage clip holding member 8. The guide groove portion 8a faces the guide groove portion 2c of the upper stage 2. Like the case described before, a large number of balls 4 the interval between which is always kept constant are inserted between the facing guide groove portions 2c and 8a via the casing 7 so as to rotate between the facing guide groove portions 2c and 8a. As a result, the guide member 6 and stage clip holding member 8 are integrally supported to be relatively movable in the X direction with respect to the upper stage 2.

Further, a stage clip 9 constructed for pinching a sample is fixed on the stage clip holding member 8. A plurality of projections (not shown) for reducing the contact resistance between the upper stage 2 and the guide member 6 are formed on the casing 7 to reduce the resistance at the time of guide movement.

Figure 3:
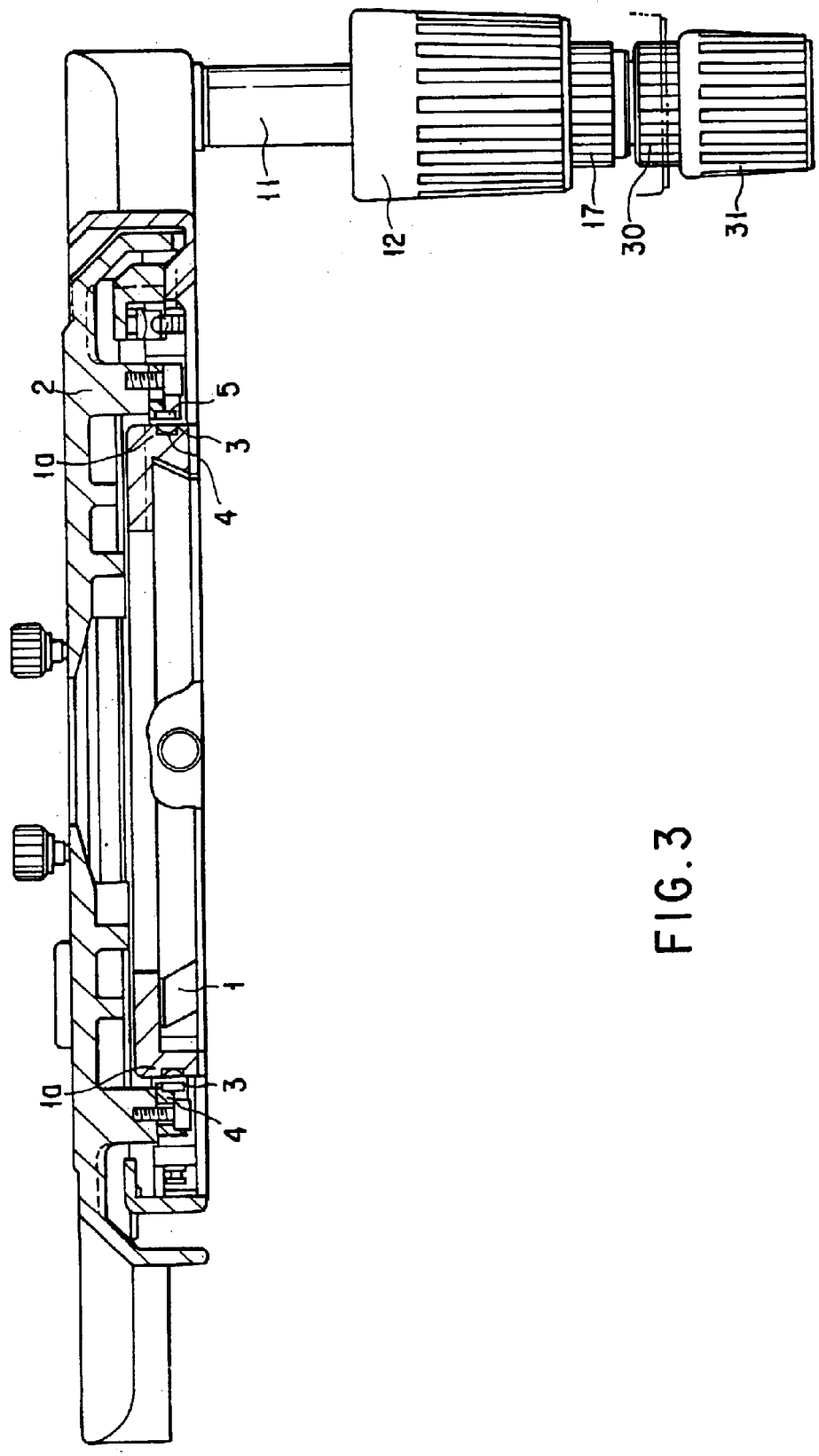
FIG. 3 is a front cross sectional view showing the construction of the microscope stage according to the first embodiment of this invention.
Figure 6:
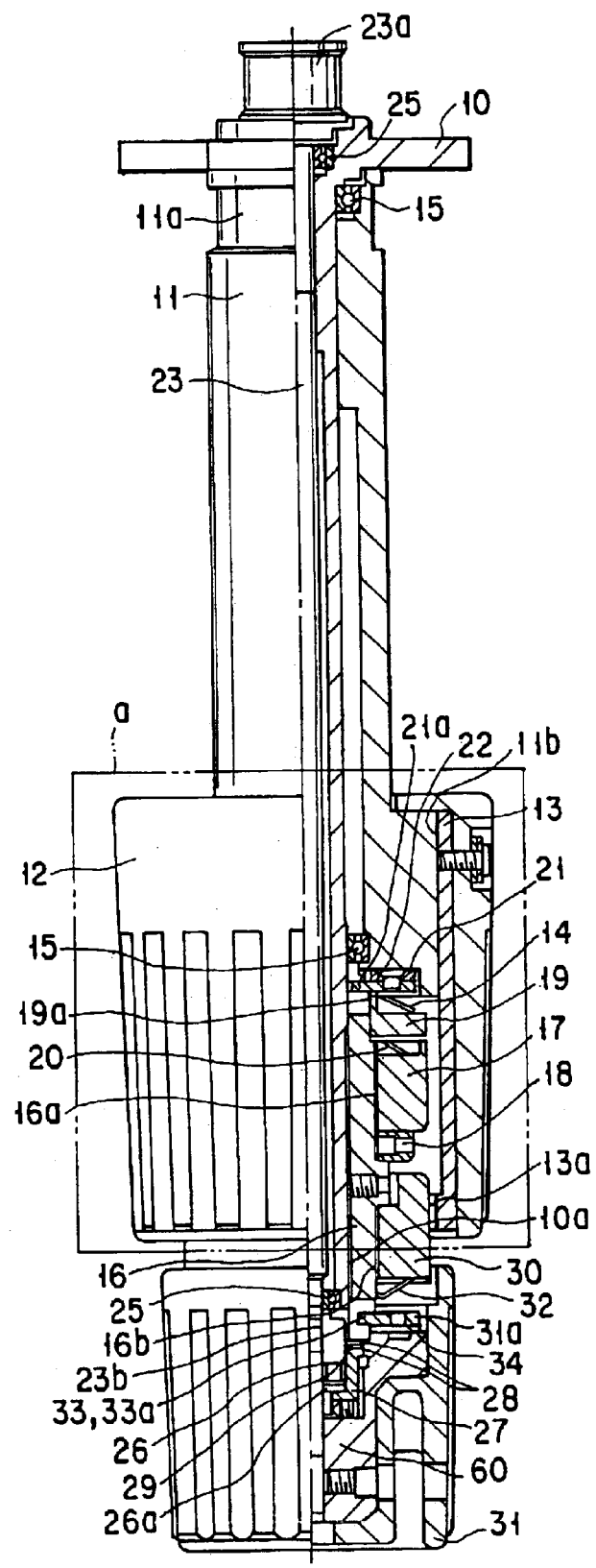
FIG. 6 is a partial cross sectional view of the handle mechanism portion of the microscope stage according to the first embodiment of this invention.
Figure 7:
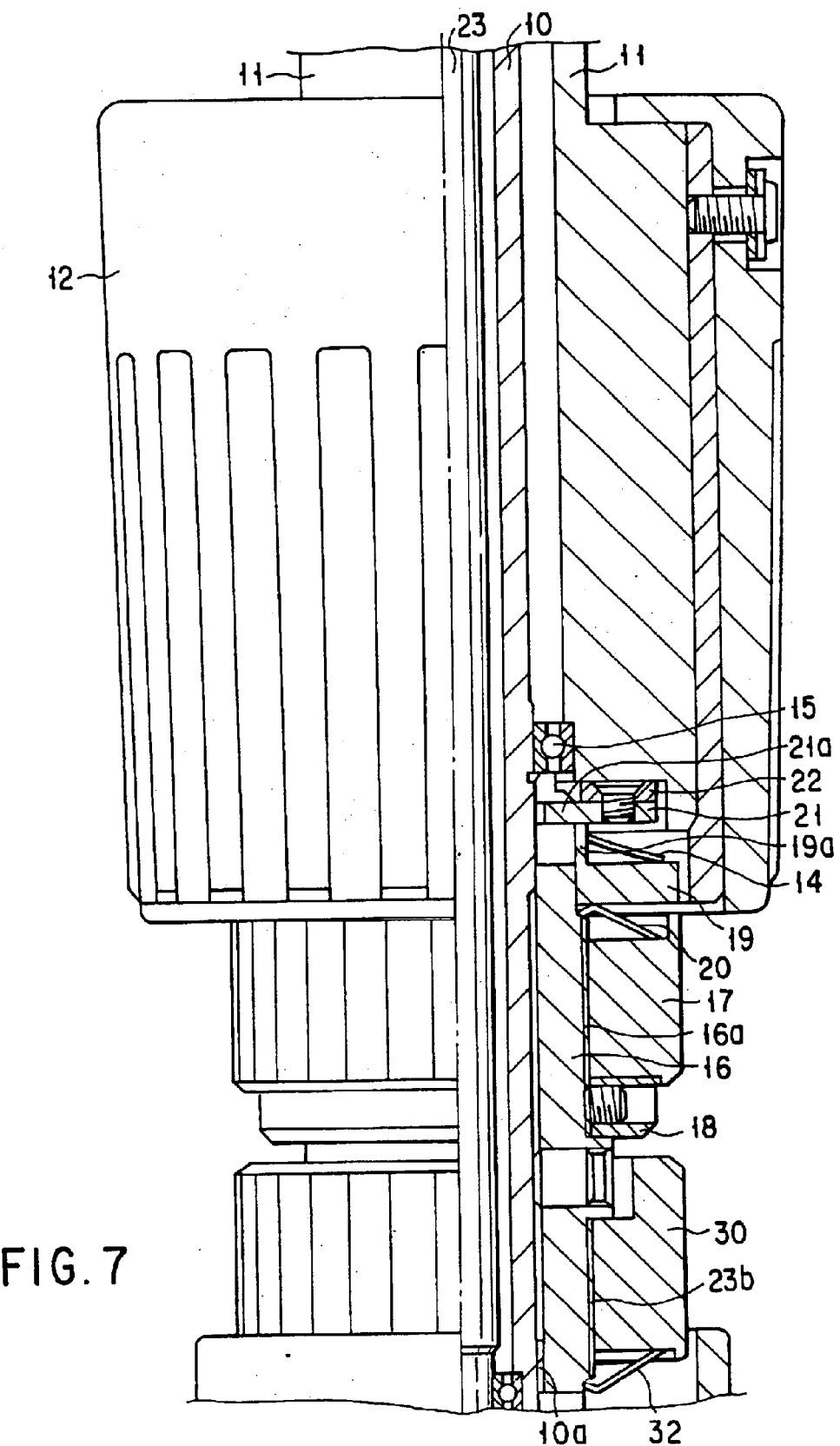
FIG. 7 is an enlarged view of the handle mechanism portion of the microscope stage according to the first embodiment of this invention.

FIG. 3 is a front cross sectional view of the microscope stage, FIG. 4 is a front cross sectional view of a handle mechanism portion, FIG. 5 is a side cross sectional view of the microscope stage, FIG. 6 is a partial cross sectional view of the handle mechanism portion and FIG. 7 is an enlarged view of a portion "a" shown in FIG. 6. In FIGS. 1 to 7, the same symbols are attached to the same portions.

As shown in FIGS. 3 to 7, a hollow fixing shaft 10 for supporting two handle shafts which will be described later is fixed on the upper stage 2 and a Y handle shaft 11 is coaxially disposed on the outer periphery of the fixing shaft 10. A pulley portion 11a on which a transmission member which will be described later is wound is disposed on one end of the Y handle shaft 11 and a guide portion 11b for guiding a slide tube 13 on which a Y handle 12 for operating the stage is fixed in the thrust direction of the Y handle shaft 11 is provided on the other end thereof. The guide portion 11b of the Y handle shaft 11 is held by friction by holding the guide portion 11b with elastic force of the slide tube 13 which is slotted in the cylindrical shape and has elastic force. Further, the stage operating Y handle 12 is fixed on the slide tube 13.

The Y handle shaft 11 is supported on the fixing shaft 10 via rolling bearings 15, 15. Further, a fixing guide 16 having a screw on the lower side of a hollow inner portion is screwed by a screw portion 10a formed on one end of the fixing shaft 10 and the Y handle shaft 11 is supported in the thrust direction by causing the upper end surface of the fixing guide 16 to press the inner ring of a bearing 15.

Further, a screw portion 16a is formed on the outer peripheral surface of the fixing guide 16 and a Y torque adjusting handle 17 and stopper ring 18 are screwed onto the screw portion 16a. By rotating the Y torque adjusting handle 17 and stopper ring 18, the Y torque adjusting handle 17 can be moved vertically (in the thrust direction of the Y handle shaft 11) with respect to the fixing guide 16 and Y handle shaft 11.

An elastic member 20 such as a wavy spring having a relatively large spring constant and a transmission ring 19 movable in the direction of the Y handle shaft 11 are disposed between the Y torque adjusting handle 17 and the Y handle shaft 11, and further, an elastic member 14 such as a wavy spring having a relatively small spring constant is disposed on the outer periphery of a small-diameter cylindrical portion 19a of the transmission ring 19. The length of the small-diameter cylindrical portion 19a of the transmission ring 19 is set lower than the free height of the elastic member 14.

A ring 21 having a rotation preventing mechanism such as a key is disposed on the stage operating Y handle shaft 11 side of the elastic member 14 and a projecting portion 21a such as a key is put into a key groove formed in the fixing guide 16 described before. As a result, the ring 21 can be moved in the thrust direction of the Y handle shaft 11, but is prevented from being rotated in the rotating direction by the projecting portion 21a and key groove. Further, a sliding washer 22 having a high sliding property is fixed on the ring 21 and made contact with a sliding portion formed on the lower end portion of the Y handle shaft 11 via grease.

Next, adjustment of a couple of rotating forces of the stage operating Y handle is explained.

If the Y torque adjusting handle 17 screwed onto the fixing guide 16 is rotated, the Y torque adjusting handle 17 moves in the Y handle shaft 11 direction by the screw portion 16a formed on the fixing guide 16. Therefore, the gap between the sliding surface of the Y handle shaft 11 and the Y torque adjusting handle 17 becomes narrower. At this time, the elastic member 14 having the small spring constant is bent earlier than the elastic member 20 having the large spring constant, the depressing force thereof acts on the sliding washer 22 via the ring 21 and friction resistance with the Y handle shaft 11 smoothly varies. In this state, the Y torque handle 17 is adjusted until depressing force which overcomes the force caused by the stage guide portion, transmission mechanism portion and the like for returning the guide occurs.

After this, the stopper ring 18 which is also screwed onto the fixing guide 16 is rotated until it strikes the Y torque adjusting handle 17, and when it strikes, the stopper 18 is fixed on the fixing guide 16 by use of a vis or the like. The operation up to now is performed at the time of manufacturing of the microscope stage, for example, in a factory.

An X handle shaft 23 is coaxially disposed inside the fixing shaft 10. A pulley portion 23a on which a transmission member as will be described later is wound is provided on one end of the X handle shaft 23, an X handle mounting member 60 is fixed on the other end thereof and a stage operating X handle 31 is mounted on the outside portion thereof. The X handle shaft 23 is supported on the fixing shaft 10 via a rolling bearing.

Further, a thrust ring 26 is screwed onto a screw portion 23b formed on the X handle shaft 23 and the stage operating X handle 31 is supported in the thrust direction with respect to the fixing shaft 10. A screw portion 26a is formed on the outer periphery of the thrust ring 26 and an adjusting ring 27 which is movable in the vertical direction with respect to the thrust ring 26 is disposed via the screw portion 26a. Two sheets of sliding washers 28 having an excellent sliding property is disposed between the upper end of the adjusting ring 27 and the lower end of the fixing guide 16 and an elastic member 29 such as a wavy spring having a relatively small spring constant is disposed therebetween.

By rotating the adjusting ring 27, the adjusting ring 27 is moved in the vertical direction by the screw portion 26a of the thrust ring 26, and resultantly, the depressing force of the elastic member 29 varies, the sliding resistance of the lower end of the fixing guide 16 varies and the couple of rotating forces of the stage operating X handle 31 vary.

Like the adjustment of force in the Y direction, the positioning of the adjusting ring 27 is made by rotating the adjusting ring 27 until the depressing force which overcomes the force caused by the stage guide portion, transmission mechanism portion and the like for returning the guide occurs and the adjusting ring 27 is fixed with respect to the thrust ring 26 by use of a vis or the like.

A screw portion 16b is formed on the lower outer peripheral surface of the fixing guide 16 and an X torque adjusting handle 30 is disposed via the screw portion 16b. By rotating the X torque adjusting handle 30, the X torque adjusting handle 30 can be moved in the vertical direction (in the thrust direction of the X handle shaft 23) with respect to the fixing guide 16. An elastic member 32 such as a wavy spring having a relatively large spring constant and a ring 33 having a rotation preventing mechanism such as a key groove are disposed between the X torque adjusting handle 30 and a sliding surface 31a formed on the X handle mounting member 60 and a projecting portion 33a such as a key is put into a key groove or the like formed in the fixing guide 16 in the same manner as in the case of Y direction.

As a result, the ring 33 can be moved in the thrust direction of the X handle shaft 23, but the rotation thereof is prevented by the rotation preventing mechanism such as the key groove and it is fixed. Further, a sliding washer 34 having an excellent sliding property is fixed on the ring 33 and the sliding washer 34 is made contact with the sliding surface 31a provided on the upper end face of the X handle mounting member 60 via grease.

Figure 8:
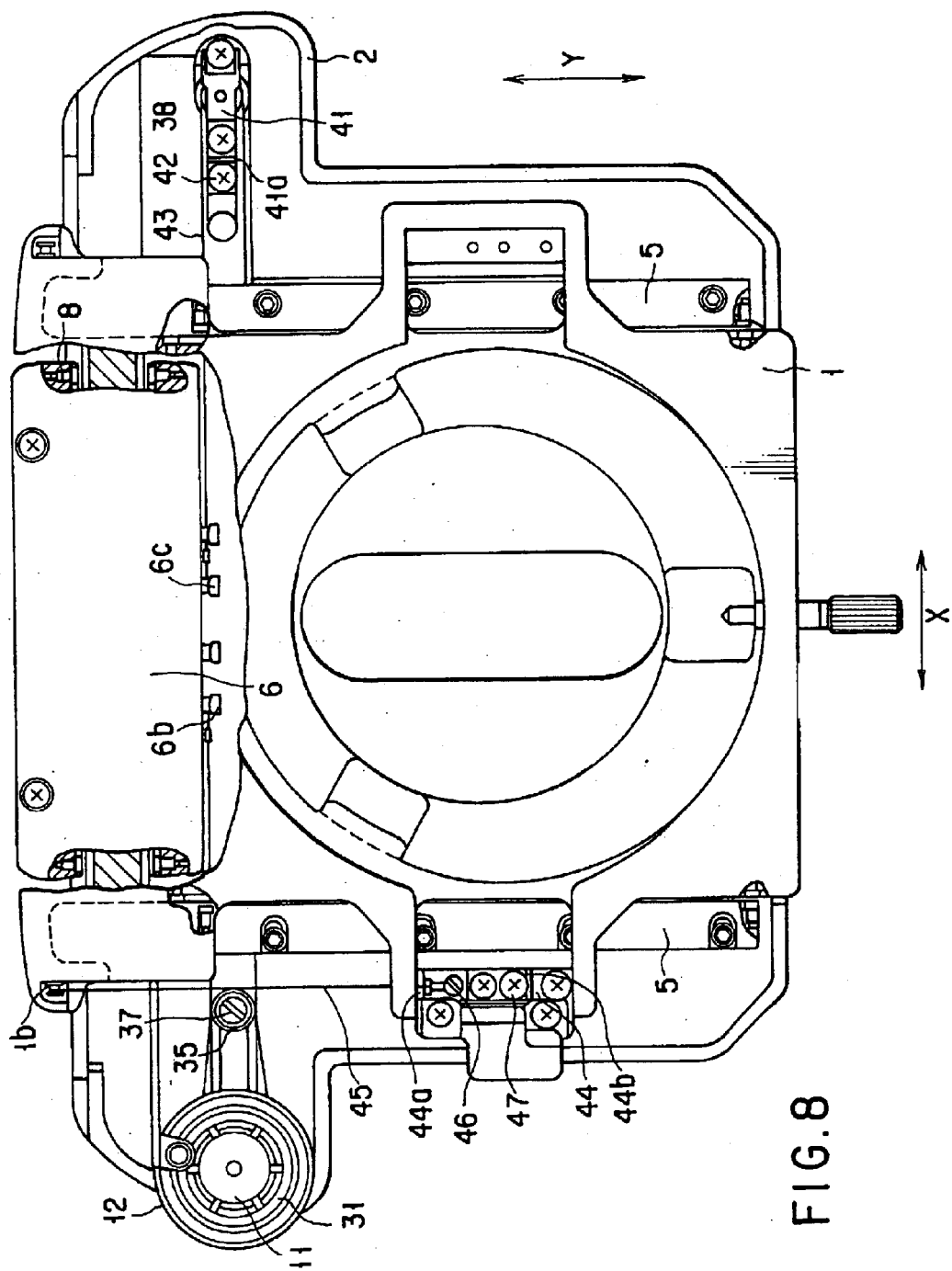
FIG. 8 is a bottom view of the microscope stage according to the first embodiment of this invention.

FIG. 8 is a bottom view of the microscope stage. The constructions of the handle mechanism portion and stage guiding mechanism portion and a mechanism for transmission of force of both of the mechanisms are explained below with reference to FIG. 8 and other drawings. A pulley 35 is disposed in a position other than the three coaxial handle shafts 10, 11, 23 described before on the upper stage 2, both ends of the pulley 35 are supported on a shaft 37 by rolling bearings 36 such as bearings and the shaft 37 is fixed on the upper stage 2. As a result, the pulley 35 is rotatably mounted with respect to the upper stage 2.

An X pulley 38 supported on a shaft 40 by a rolling bearing 39 such as a bearing is present in a position different from the handle shafts 10, 11, 23 and pulley 35 and the shaft 40 is fixed on the upper stage 2 via a tension adjusting member 41. Further, the tension adjusting member 41 has an inclined surface portion 41a and is constructed such that the tension adjusting member 41 will be depressed by an inclined surface of a tap provided on the upper stage 2 and a countersunk screw 42 screwed into the tap, the position of the tension adjusting member 41 is determined by adjusting the degree of screwing of the countersunk screw 42 and it is fixed on the upper stage 2. As a result, like the Y pulley 35 described before, the X pulley 38 is rotatably mounted with respect to the upper stage 2.

Next, transmission of force of the two handle shafts 11, 23, lower stage 1 and stage clip holding member 8 is explained.

In the X direction, one end of a linear member 43 such as a wire rope is hooked on a hook portion 6b formed on the X guide member 6 mounted on the stage clip holding member 8, the linear member 43 is wound by one turn around the pulley portion 23a of the X handle shaft 23, stretched over the X pulley 38 rotatably supported by bearing on the upper stage 2 and the other end of the linear member 43 is hooked on a hook portion 6c formed on the guide member 6.

Further, the above-described X pulley 38 is rotatably supported on the tension adjusting member 41 via the shaft 40 and rolling bearing 39 such as a bearing and the tension adjusting member 41 is pulled in a direction opposite to the pulley portion 23a of the handle shaft 23 along the X direction and fixed on the upper stage 2. As a result, the pulley portion 23a of the X handle shaft 23 is always tightened by the linear member 43.

In the Y direction, a tension adjusting member 44 which can be moved and fixed in the Y direction as will be described later is mounted on the lower stage 1 and the tension adjusting member 44 has a hook portion (pin) 44a capable of hooking and fixing a linear member 45 such as a wire rope. One end of the linear member 45 is hooked on the tension adjusting member 44, the linear member 45 is bent in the Y handle shaft 11 direction by the Y pulley 35 rotatably fixed on the upper stage 2, wound on the pulley portion 11a of the Y handle shaft 11 by half turn, bent in the Y direction by the Y pulley 35 again, turned back at a hook portion 1b provided on the lower stage 1, bent in the Y handle shaft 11 direction by the Y pulley 35 again, wound on the pulley portion 11a of the Y handle shaft 11 by half turn and bent in the Y direction by the Y pulley 35, and the other end of the linear member 45 is hooked and fixed on a pin 46 mounted on the tension adjusting member 44. In this case, the number of turns of the linear member 45 on the pulley and the number of turn-backs may be changed according to an aimed performance of the stage.

Further, like the X direction tension adjusting member 41, the tension adjusting member 44 has an inclined surface portion 44b and is constructed such that the tension adjusting member 44 will be depressed by an inclined surface of a tap provided on the lower stage 1 and a countersunk screw 47 screwed into the tap, the position of the tension adjusting member 44 is determined by adjusting the degree of screwing of the countersunk screw 47 and it is fixed on the lower stage 1. As a result, tension of the linear member 45 can be adjusted and the pulley portion 11a of the Y handle shaft 11 is always tightened by the linear member 45 having tension.

The transmission mechanism of the linear member is concretely explained below.

Figure 9:
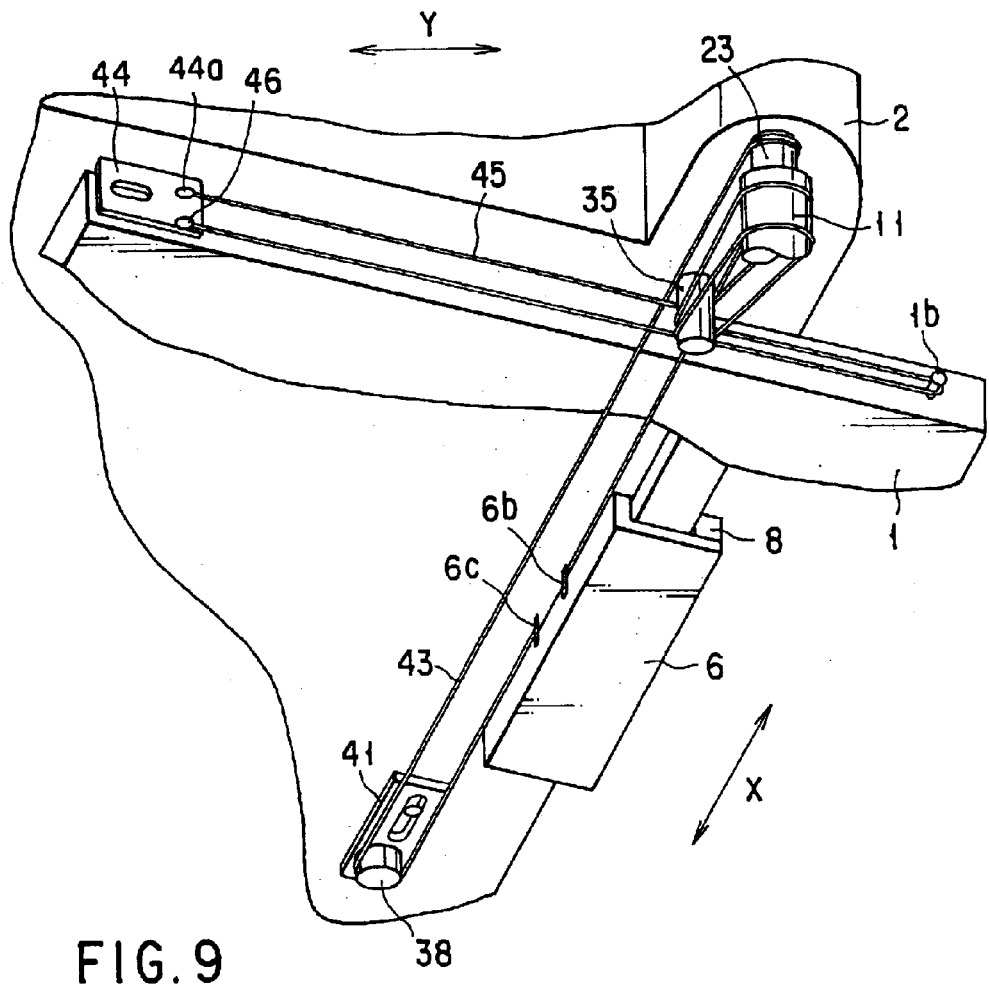
FIG. 9 is a simulated view showing a transmission mechanism of a linear member of the microscope stage according to the first embodiment of this invention.

FIG. 9 is a simulated view showing the transmission mechanism of the linear member. In FIG. 9, the same symbols are attached to the same portions as those of FIGS. 1 to 8. As described above, the microscope stage includes the upper stage 2 and lower stage 1 which are stacked in the vertical direction and the upper stage 2 is directly driven, guided and moved with respect to the lower stage 1.

On the upper stage 2, the Y pulley 35 is rotatably mounted and the Y handle shaft 11 is rotatably mounted in a position different from the Y pulley 35. On the side surface of the lower stage 1, both end portions of the long and narrow linear member 45 are respectively hooked and fixed on the pins 44a, 46 of the tension adjusting member 44 capable of adjusting tension. One end of the linear member 45 is hooked on the pin 44a of the tension adjusting member 44 and the linear member 45 is bent at the Y pulley 35 and wound on the pulley portion of the Y handle shaft 11 by half turn. Then, the linear member 45 is bent at the Y pulley 35 again and turned back at the hook portion (pin) 1b provided in a position in a moving direction different from the positions in which both ends of the linear member 45 are hooked on the lower stage 1. Further, the linear member 45 is bent at the pulley 35 and wound on the pulley portion of the Y handle shaft 11 by half turn. Then, the linear member 45 is bent again at the pulley 35 and the other end portion thereof is fixed on the pin 46 of the tension adjusting member 44. The pulley 35 and Y handle shaft 11 are always tightened by the linear member 45 and the upper stage 2 can be moved with respect to the lower stage 1 by rotating the Y handle shaft 11.

On the other hand, the stage clip 9 is disposed on the upper stage 2 as described above and the stage clip 9 is fixed on the stage clip holding member 8. The stage clip holding member 8 is directly driven and guided with respect to the upper stage 2 via a guide mechanism. Both end portions of the long and narrow linear member 43 are respectively hooked on the hook portions 6b, 6c provided on the X guide member 6 and it is stretched and disposed in the directly driving and guiding direction by the X pulley 38 and X handle shaft 23. One end portion of the linear member 43 is hooked on the hook portion 6b and the linear member 43 is wound by one turn on the pulley portion of the X handle shaft 23 which is disposed coaxially with the Y handle shaft 11 rotatably mounted on the upper stage 2. Further, the linear member 43 is wound by half turn on the X pulley 38 rotatably supported by bearing on the upper stage 2 and the other end portion thereof is hooked on the hook portion 6c. By pulling the linear member 43 in a direction to separate the X pulley 38 apart from the X handle shaft 23 and fixing the same, the linear member 43 is always kept stretched and the X handle shaft 23 is tightened. Therefore, by rotating the X handle shaft 23, the X guide member 6, stage clip holding member 8 and stage clip 9 can be moved with respect to the upper stage 2.

Next, the operation of the microscope stage thus constructed is explained. When it is desired to move the upper stage 2 in the Y direction with respect to the lower stage 1 fixed on the microscope main body, the operator operates and rotates the stage operating Y handle 12 by hand. If the stage operating Y handle 12 is rotated, the slide tube 13 fixed on the stage operating Y handle 12 starts to rotate. Further, by rotating the slide tube 13, the Y handle shaft 11 is rotated by the depressing force of the slide tube 13 and friction force between the Y handle shaft guiding portion 11b and the slide tube 13.

At this time, the depressing force of the Y handle shaft 11 in the thrust direction by the elastic members 14 and 20 acts on the slide surface of the Y handle shaft 11 via the slide washer 22 to give rotation resistance. At this time, the ring 21 and slide washer 22 are stably prevented from rotating by the rotation preventing mechanism constructed by the key groove and key formed on the fixing guide 16 and ring 21. Further, if the Y handle shaft 11 is rotated, the pulley portion 11a formed on the Y handle shaft 11 is rotated.

Since the linear member 45 such as a wire rope is wound on the pulley portion 11a of the Y handle shaft 11, the linear member 45 is continuously fed by rotation of the pulley portion 11a, and as a result, the pulley portion 11a is moved in the Y pulley 35 direction while it is rotated with the linear member 45 wound thereon. The continuously fed linear member 45 is bent by the Y pulley 35 to change the direction thereof to the Y direction and it is moved. Since the pulley portion 11a of the Y handle shaft 11 is fixed on the upper stage 2 via the shaft 37 and bearing 39, the Y guide member 5 fixed on the upper stage 2 and the guide groove portion 2a formed in the upper stage 2 are directly driven and guided and moved by the lower stage 1 and balls 4 according to the movement of the pulley portion 11a, and consequently, the upper stage 2 is moved in the Y direction.

Since the linear member 45 is fixed on the lower stage 1 while it is stretched by the elastic adjusting member 44 and always tightens the Y handle shaft pulley portion 11a, friction occurs between the Y handle shaft pulley portion 11a and the linear member 45. Therefore, at the time of rotation, no slip occurs between the pulley portion 11a and the linear member 45 and the upper stage 2 can follow a rotation amount of the pulley portion 11a and can be accurately moved.

The movement of the upper stage 2 is determined according to the rotating direction and rotation amount of the pulley portion 11a of the Y handle shaft 11. The magnitude of torque of the pulley portion 11a of the Y handle shaft 11 is determined by friction force acting between the pulley portion 11a and the linear member 45. Therefore, enhancement of the torque can be attained by subjecting the pulley portion 11a of the Y handle shaft 11 to a process such as a blast process or rubber coating for enhancing the friction coefficient or a process for enhancing the tension of the linear member 45 by use of the tension adjusting member 44 or the like.

When it is desired to move the stage clip holding member 8 in the X direction with respect to the upper stage 2, the operator rotates the stage operating X handle 31. If the stage operating X handle 31 is rotated, the X handle shaft 23 fixed on the stage operating X handle 31 and the pulley portion 23a are both rotated.

At this time, friction resistance by the depressing force of the elastic member 32 held between the fixing guide 16 and the ring 33 and friction force caused by the depressing force of the elastic member 32 generated by the X torque adjusting handle 30 and the slide surface 31a of the stage operating X handle 31 act on the sliding surface via the sliding washers 28 and 34 and both of the friction resistances become rotation resistances.

Further, if the pulley portion 23a of the X handle shaft 23 is rotated, the linear member 43 such as a wire rope wound on the pulley portion 23a is fed according to the rotation direction of the pulley portion 23a, and as a result, the X guide member 6 is pulled and moved by the linear member 43. Since the stage clip holding member 8 is fixedly mounted on the X guide member 6, the guide groove portion 2a formed in the upper stage 2 is directly driven, guided and moved by the lower stage 1 and balls 4 when the X guide member 6 is moved, and consequently, the stage clip holding member 8 and the stage clip 9 fixed on the stage clip holding member 8 are moved in the X direction with respect to the upper stage 2.

Since the linear member 43 is fixed on the upper stage 2 while it is stretched by the X pulley 38 via the tension adjusting member 41 so as to always tighten the pulley portion 23a of the X handle shaft 23, friction occurs between the pulley portion 23a and the linear member 43 and no slip occurs between the pulley portion 23a and the linear member 43 at the time of rotation so that the X guide member 6 can follow a rotation amount of the pulley portion 23a and can be accurately moved. The movement of the X guide member 6 is determined according to the rotating direction and rotation amount of the pulley portion 23a of the X handle shaft 23. Further, the magnitude of torque of the pulley portion 23a of the X handle shaft 23 is the same as in the case of Y direction described before.

Next, adjustment of a couple of handle rotating forces which the operator (user) freely makes is explained. As described before, the couple of handle rotating forces are friction resistances by the depressing forces of the elastic members 14, 29 having the relatively small spring constant and the elastic members 20, 32 having the large spring constant. Among them, the elastic members 14, 29 having the smaller spring constant determine the depressing force by assembling adjustment prior to the shipment from the factory and always act on the amount of handle rotating force as a brake to maintain the stage stop precision. Further, the elastic members 20, 32 having the larger spring constant can be used to change the depressing force to given depressing force according to the user's preference and set the same according to the applicability of the stage.

The action when the couple of forces are changed is made based on the above description such that the slide tube 13 which holds by friction the guide portion 11b of the Y handle shaft 11 fixed on the stage operating Y handle 12 is upwardly moved when the stage operating Y handle 12 is moved upwardly. Then, the projecting portion 13a of the slide tube 13 can be moved upwardly until it strikes the Y handle shaft 11.

When the stage operating Y handle 12 is upwardly moved, the operations of the torque adjusting handles 17, 30 screwed onto the fixing guide 16 become possible. That is, when a couple of forces at the time of operation in the Y direction are changed, the Y torque adjusting handle 17 is rotated and moved by rotation to narrow the gap with the sliding surface of the Y handle shaft 11. Then, the elastic member 20 having the large spring constant is moved without being bent according to the movement of the Y torque adjusting handle 17 and the transmission ring 19 moves towards the sliding surface of the Y handle shaft 11. When the transmission ring 19 is moved, the bending of the elastic member 14 having the small spring constant increases, the depressing force becomes stronger by an amount corresponding to an increase in the bending, and the ring 21 and sliding washer 22 strongly depress the sliding surface of the Y handle shaft 11, thereby increasing the couple of rotating forces.

Further, when the Y torque adjusting handle 17 is rotated, the elastic member 14 is further bent and the upper end portion of the small-diameter cylindrical portion 19a of the transmission ring 19 strikes the ring 21 to prevent the elastic member 14 from being further bent.

If the Y torque adjusting handle 17 is operated to be rotated so as to further enhance the couple of rotating forces, the elastic member 20 having the relatively large spring constant is bent since the elastic member 14 cannot be bent by the transmission ring 19, and the depressing force becomes stronger. The depressing force is transmitted to the ring 21 and sliding washer 22 via the transmission ring 19 to enhance friction force of the sliding surface of the Y handle shaft 11, thus changing the amount of rotating force. At this time, if the maximum bending amount of the elastic member 14 is designed to be set within the elastic deformation range of the elastic member 14, so-called wearout of the spring can be prevented. Further, if rotation of the Y torque adjusting handle 17 is continued, the bending amount of the elastic member 20 becomes large, the couple of maximum forces are obtained when the stopper portion formed on the Y torque adjusting handle 17 and the transmission ring 19 strike each other and it becomes impossible to further rotate the same.

When the Y torque adjusting handle 17 is reversely rotated, the gap between the Y torque adjusting handle 17 and the sliding surface of the Y handle shaft 11 is widened and the bending of the elastic member 20 is reduced, thereby reducing the depressing force. If the Y torque adjusting handle 17 is further rotated, one end of the Y torque adjusting handle 17 strikes the stopper ring 18 to prevent the rotating operation from being further effected and the couple of forces for the stage rotating operation become minimum. At this time, the bending of the elastic member 14 having the small spring constant maintains the initial depressing force since no settling of the spring or the like occurs.

Further, even if the elastic member 20 having the large spring constant is settled or the striking force of the elastic member 20 is changed, the depressing force is not largely changed from the initial state since the spring constant of the elastic member 14 is small, and the stable brake force can be attained and the stop precision can be maintained.

Further, in the X direction, by rotating and operating the X torque adjusting handle 30 screwed onto the fixing guide 16, the depressing force of the elastic member 32 acts on the sliding surface of the stage operating X handle 31 via the ring 33 and sliding washer 34 and changes the friction, and the couple of forces can be changed. At this time, since a change of the elastic member 29 does not make contribution and the initially adjusted depressing force is maintained, the brake force stably acts and the stop precision is made stable like the case of Y direction.

According to the first embodiment, a construction is made in which the elastic member for determining the amount of rotating force of the handle has two types of springs having different spring constants for the X and Y directions and the transmission ring for restricting the excessive bending of the spring having the smaller spring constant is provided.

That is, the bending amount is obtained by the spring having the small spring constant, a change in the dimensions and striking of the spring are absorbed and brake force which overcomes force for returning the above-described guide is obtained from the depressing force thereof. Further, the spring having the large spring constant is a spring in which mainly the depressing force is changed at the time of adjustment of the couple of forces, generates large depressing force and makes the variable range of the handle rotating force large.

Further, in the Y direction, the transmission ring is disposed between the spring having the large spring constant and the spring having the small spring constant, depressing force generated from the spring having the large spring constant is transmitted to the sliding surface at the time of changing of the couple of forces and the spring having the small spring constant is bent with the bending amount within elastic deformation owing to the depressing force so as to play a role of a stopper for preventing the bending more than necessary.

By making the above handle construction, a microscope stage can be realized which provides good feeling and in which the elastic member disposed on the guide as in the conventional case can be omitted and the amount of handle rotating force can be attained with the stop precision always kept stable and lightly operating feeling.

Figure 10:
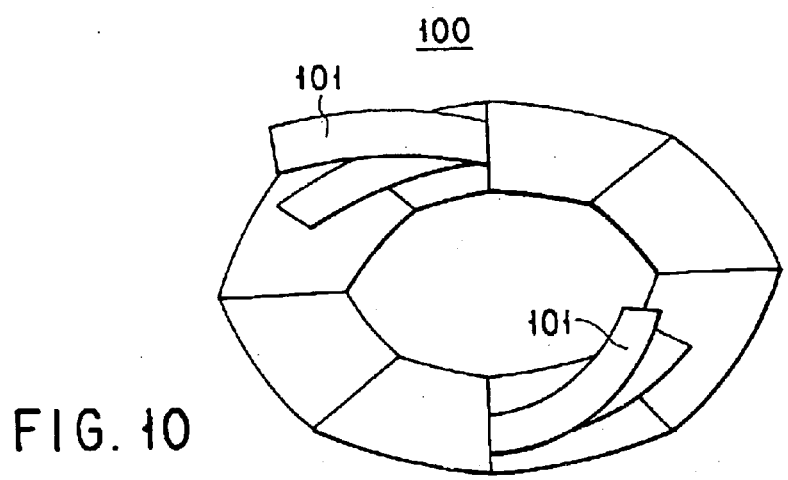
FIG. 10 is a perspective view showing the construction of an elastic member according to the first embodiment of this invention.

Further, in the first embodiment, in order to attain the couple of handle rotating forces in the X and Y directions, two elastic members including the springs having the large and small spring constants are used. Instead of using the two elastic members, it is possible to use an elastic member 100 formed by cutting out a preset portion 101 of a corrugated washer as shown in FIG. 10 and attain a plurality of spring constants by use of one elastic member. As the construction, the elastic members 14, 20 shown in the first embodiment are replaced by the elastic member 100 shown in FIG. 10 and the other construction, operation and effect are exactly the same as those of the first embodiment.

Figure 11:
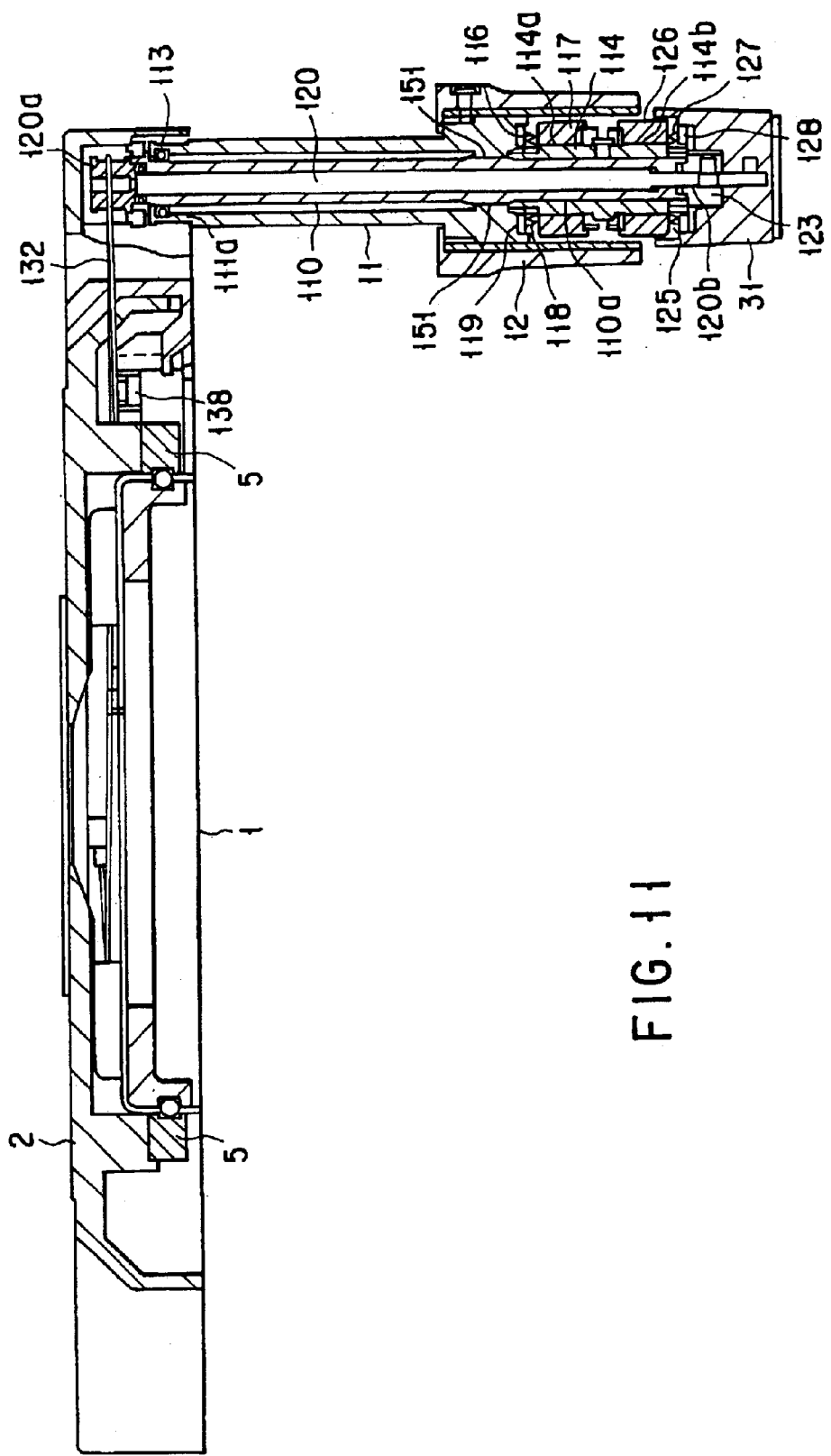
FIG. 11 is a front cross sectional view of a microscope stage according to a second embodiment of this invention.
Figure 12:
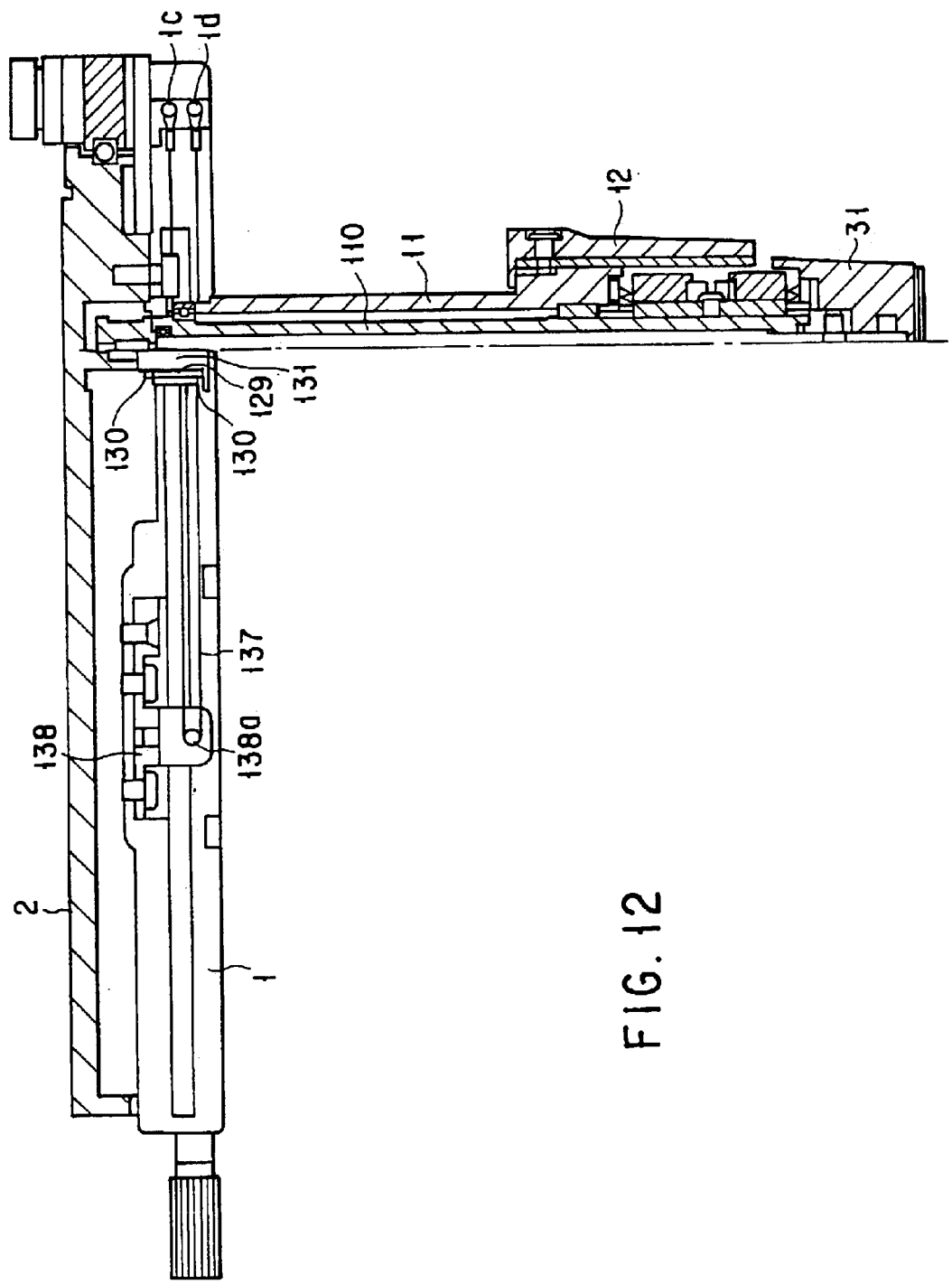
FIG. 12 is a side cross sectional view of the microscope stage according to the second embodiment of this invention.
Figure 13:
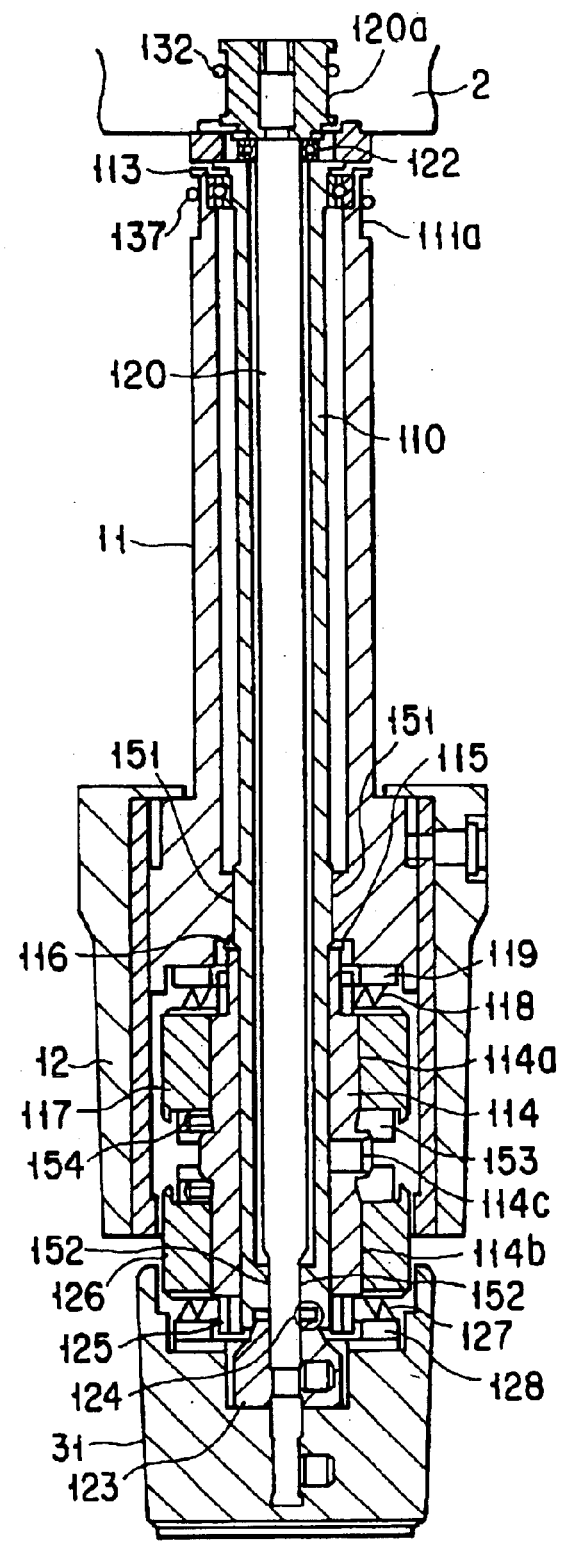
FIG. 13 is an enlarged cross sectional view of a handle mechanism portion of the microscope stage according to the second embodiment of this invention.

FIG. 11 is a front cross sectional view (A—A cross sectional view of FIG. 14 as will be described later) of a microscope stage according to a second embodiment of this invention and FIG. 12 is a side cross sectional view (B—B cross sectional view of FIG. 14 as will be described later) of the microscope stage. FIG. 13 is an enlarged cross sectional view of a handle mechanism portion shown in FIGS. 11, 12. The same symbols are attached to the same portions in FIGS. 11, 12, 13 and FIGS. 1, 2.

As shown in FIGS. 11, 12, 13, a hollow cylindrical fixing shaft 110 for supporting two handle shafts which will be described later is vertically fixed on an upper stage 2 and a hollow cylindrical Y handle shaft 11 whose inside diameter is larger than the outside diameter of the fixing shaft 110 is coaxially disposed on the outer side of the fixing shaft 110. A pulley portion 111a on which a linear member (for example, wire rope) as a driving force transmitting member as described later is wound is disposed on one end (upper stage 2 side) of the Y handle shaft 11 and a Y handle 12 for operating and rotating the handle shaft 11 is mounted on the other end thereof. The Y handle shaft 11 is rotatably supported with respect to the fixing shaft 110 via a bearing. As the bearing, a bearing 113 is disposed as a rolling bearing on the pulley portion 111a side. On the Y handle 12 side, stepped portions are formed on the inside diameter portion of the handle shaft 11 and the outside diameter portion of the fixing shaft 110, respectively, to form a Y engaging portion 151 in which the Y handle shaft 11 and fixing shaft 110 are engaged and a slide bearing is formed by using a lubricant such as grease in this portion.

Further, a screw portion 110a is formed below the stepped portion of the outside diameter portion of the fixing shaft 110 and a hollow cylindrical fixing guide 114 is screwed onto the screw portion 110a. It is assumed that the pulley portion 111a side in FIG. 13 is an upper side and the Y handle 12 side is a lower side. The upper end face of the fixing guide 114 faces a thrust supporting portion 115 which lies below the Y engaging portion 151 inside the Y handle shaft 11 and a washer 116 having an excellent sliding property is inserted therein. By supporting the thrust supporting portion 115 by use of the fixing guide 114 via the washer 116, a bearing in the thrust direction is formed. The position of the fixing shaft 114 in the axial direction can be adjusted by rotating the same and it is fixed by a set vis 114c after adjusting the position thereof to eliminate backlash in the thrust direction.

Screw portions 114a, 114b are formed in two portions in which the outside diameter of the outside diameter portion of the fixing guide 114 is made large by one step and a Y torque adjusting handle 117 is screwed onto the screw portion 114a among them. The upper end face of the Y torque adjusting handle 117 faces the lower end face of the Y handle shaft 11 and an elastic member 118 such as a wavy spring and a washer 119 having an excellent sliding property are inserted in the portion. When the Y torque adjusting handle 117 is rotated, the amount of rotating force of the Y handle 12 can be adjusted since depressing force acting on the contact surface between the Y handle shaft 11 and the washer 119 is changed by the elastic member 118.

When the Y torque adjusting handle 117 is set in the lowest position, the amount of rotating force of the Y handle 112 becomes only the resistance force in the bearing 113, Y engaging portion 151 and thrust supporting portion 115 since the Y handle shaft 11 and washer 119 are separated from each other and the depressing force due to the elastic member 118 does not act. After adjustment of the amount of force, rotation of the Y torque adjusting handle 117 is prevented by abutting a fixing collar 153 against the Y torque adjusting handle 117 from below and fixing the same by a fixing collar set vis 154.

An X handle shaft 120 is coaxially disposed inside the fixing shaft 110. A pulley portion 120a on which a driving force transmitting member (for example, linear member such as a wire rope or the like) as will be described later is wound is disposed on one end (upper stage 2 side) of the X handle shaft 120 and an X handle 31 for operating and rotating the handle shaft is mounted on the other end thereof. The X handle shaft 120 is rotatably supported with respect to the fixing shaft 110 via a bearing.

The operating handle in the X direction basically has the same construction as the Y handle described above, and as the bearing, a bearing 122 is disposed as a rolling bearing on the pulley portion 120a side. On the X handle 31 side, an X engaging portion 152 which is engaged with stepped portions respectively formed on the outside diameter portion of the X handle shaft 120 and the inside diameter portion of the fixing shaft 110 is formed and a slide bearing is formed by using a lubricant such as grease in this portion.

The bearing in the thrust direction is also the same as in the case of the above-described Y handle and has a construction in which a washer 125 having an excellent sliding property is inserted and supported by a thrust supporting portion 124 of the fixing shaft 110 and a thrust ring 123 screwed onto the X handle shaft 120. Likewise, in the rotating force amount adjusting mechanism of the X handle, an elastic member 127 such as a wavy spring and a washer 128 having an excellent sliding property are inserted between the X handle 31 and the X torque adjusting handle 126 screwed onto the fixing guide 114 and the amount of rotating force of the X handle 31 can be adjusted by rotating the X torque adjusting handle 126. If the X torque adjusting handle 126 is set in the highest position, the amount of rotating force of the X handle 31 becomes only the resistance force in the bearing 122, X engaging portion 152 and thrust supporting portion 124 since the X handle shaft 120 and washer 128 are separated from each other and the depressing force due to the elastic member 127 does not act.

The construction of the stage operating handle is explained below in detail based on FIG. 13. The Y handle shaft 11 and X handle shaft 120 are coaxially and rotatably disposed on the outside and inside portions of the fixing shaft 110 fixed on the upper stage 2 via the bearings, respectively. The rolling bearing such as the bearing 113 is disposed on the pulley portion side of the Y handle shaft 11 and X handle shaft 120 to suppress an influence by tension of the linear members 132 and 137. Further, the sliding bearing is used as the bearing on the X handle 31 side and a lubricant such as grease is applied to the surrounding portions of the fixing shaft 110 in the engaging portions of the Y handle 12 and X handle 31. As a result, viscosity is given to the rotation of the Y handle 12 and X handle 31 to make the start of the movement and rotation thereof smooth and make the start of the movement and sliding of the Y handle 12 in the vertical direction smooth.

Figure 14:
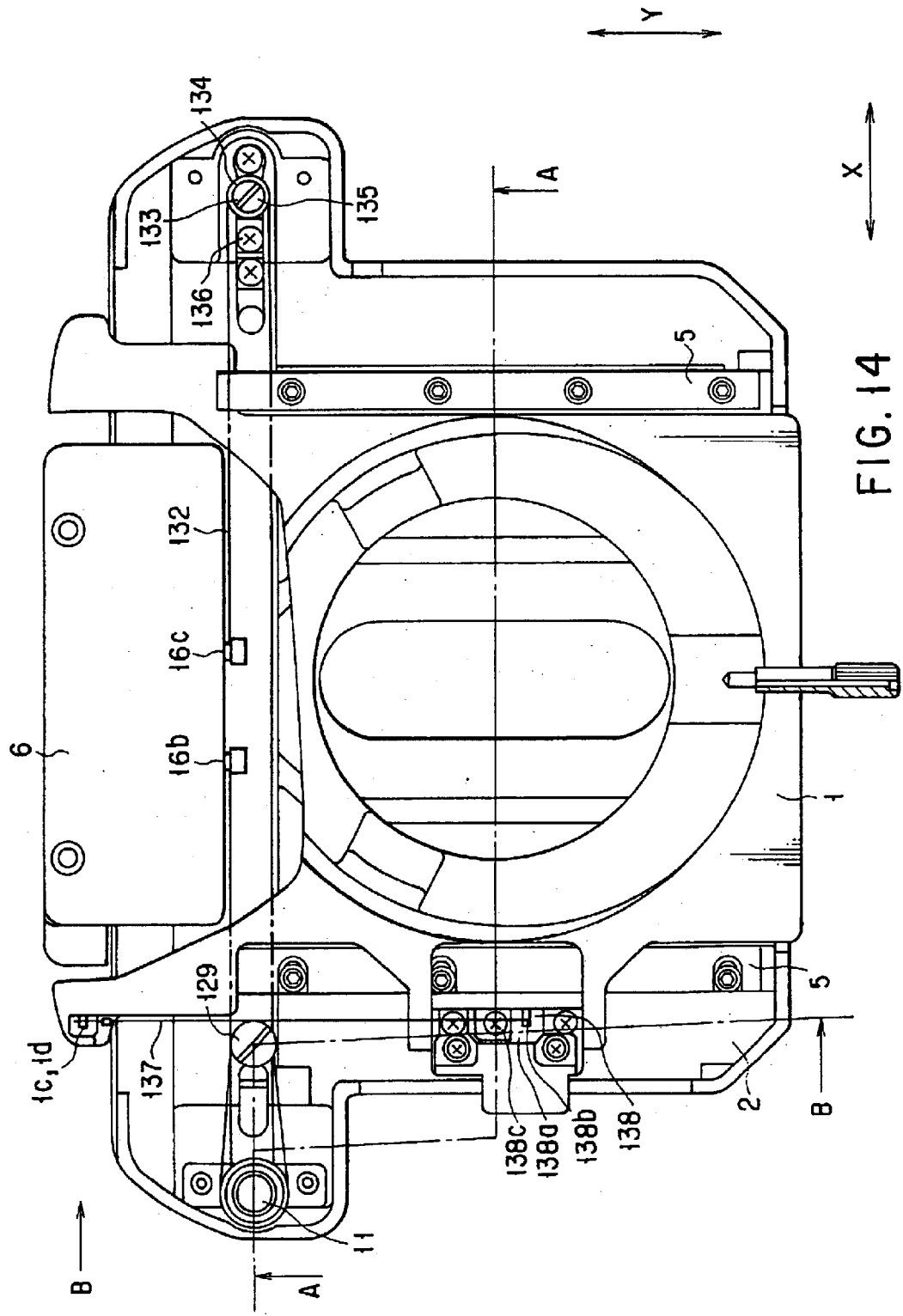
FIG. 14 is a bottom view of the microscope stage according to the second embodiment of this invention.

FIG. 14 is a bottom view showing the construction of the microscope stage. In FIG. 14, the same symbols are attached to the same portions as those of FIGS. 11, 12, 13 and FIGS. 1, 2. Transmission of the two handle shafts 11, 120 and the lower stage 1 and stage clip holding member 8 is described below.

As shown in FIG. 14, in the X direction, an X tension adjusting member 136 having an X pulley 133 is disposed in a position substantially opposite to the operating handle shaft with respect to the center of the stage. The X tension adjusting member 136 has a flat plate portion 136a having a long hole for fixing formed therein and the X pulley 133 rotatably pivoted on the flat plate portion 136a and is fixed on the upper stage 2 by a fixing vis 136b. The fixing position thereof can be adjusted in the X direction in the range of the long hole. Further, hook portions 16b, 16c for fixing the end portions of the linear member 132 such as a wire rope are disposed on two portions of the side surface of the guide member 6 guided to be linearly movable in the X direction.

Loops are formed in both end portions of the linear member 132 so that they can be hooked and fixed on the hook portions 16b, 16c disposed on the guide member 6. One end of the linear member 132 is hooked on the hook portion 16b, the linear member 132 extending from the hook portion 16b is wound on the pulley portion 120a of the X handle shaft 120 by one turn and stretched over the X pulley 133 of the X tension adjusting member 136, and the other end thereof is hooked on the hook portion 16c. Preset tension is applied to the linear member 132 by pulling the x tension adjusting member 136 in a direction opposite to the X handle shaft 120 along the X direction and fixing the same, and the X pulley 120a is set into a state in which it is tightened by the linear member 132.

In the Y direction, hook portions 1c, 1d are disposed on one end side of the side surface portion of the lower stage 1 along the Y direction and a Y tension adjusting member 138 is mounted on the other end side thereof. The Y tension adjusting member 138 has a flat plate portion 138a having a long hole for fixing formed therein and a pin 138b planted on the flat plate portion 138a and is fixed on the lower stage 1 by a fixing vis 138c. The fixing position can be adjusted in the Y direction in the range of the long hole.

Further, a pulley 129 is disposed in a position different from the above-described three coaxial handle shafts 110, 11 and 120 on the upper stage 2, more specifically, in a position in which the linear member is made substantially contact with the outside diameter portion when the linear member is stretched between the hook portions 1c, 1d and the pin 138b. The position of the pulley 129 in the Y direction lies on a line connecting the shaft centers of the operating handle and X pulley 133. The pulley 129 is rotatably supported by a rolling bearing 130 such as a bearing with respect to a shaft 131 planted on the undersurface of the upper stage 2. A linear member 137 such as a wire rope for Y shaft driving has loops on both ends and one end thereof is hooked on the hook portion 1c.

The linear member 137 is bent in the direction of the Y handle shaft 11 by the pulley 129, wound by one turn on the pulley portion 111a of the Y handle shaft 11 and bent in the Y direction by the pulley 129 again. Further, the linear member 137 is hooked on the pin 138b of the tension adjusting member 138 whose position can be adjusted in the Y direction with respect to the lower stage 1, turned back, wound on the pulley 129 by one turn and the other end is hooked on the hook portion 1d formed on the lower stage 1. The pulley portion 111a of the Y handle shaft 11 is always tightened by the linear member 137 by stretching the tension adjusting member 138 in a direction opposite to the pulley 129 along the Y direction and fixing the same on the lower stage 1 by the vis 138c.

In the above description, one example of the method for stretching the linear members 132, 137 is shown, but the number of turns in the pulley 129 and pulley portions 111a, 120a can be made plural (multiplex winding) or they can be stretched between the pulley 129 and the pulley portion 111a, between the hook portions 1c, 1d and the pulley portion 129, between the pulley portion 129 and the projecting portion 138a in a multistage fashion (stretched by plural times). Further, an endless linear member obtained by eliminating both end portions of the linear members 132 and 137 may be used.

The transmission mechanism of the linear member is concretely explained below.

Figure 15:
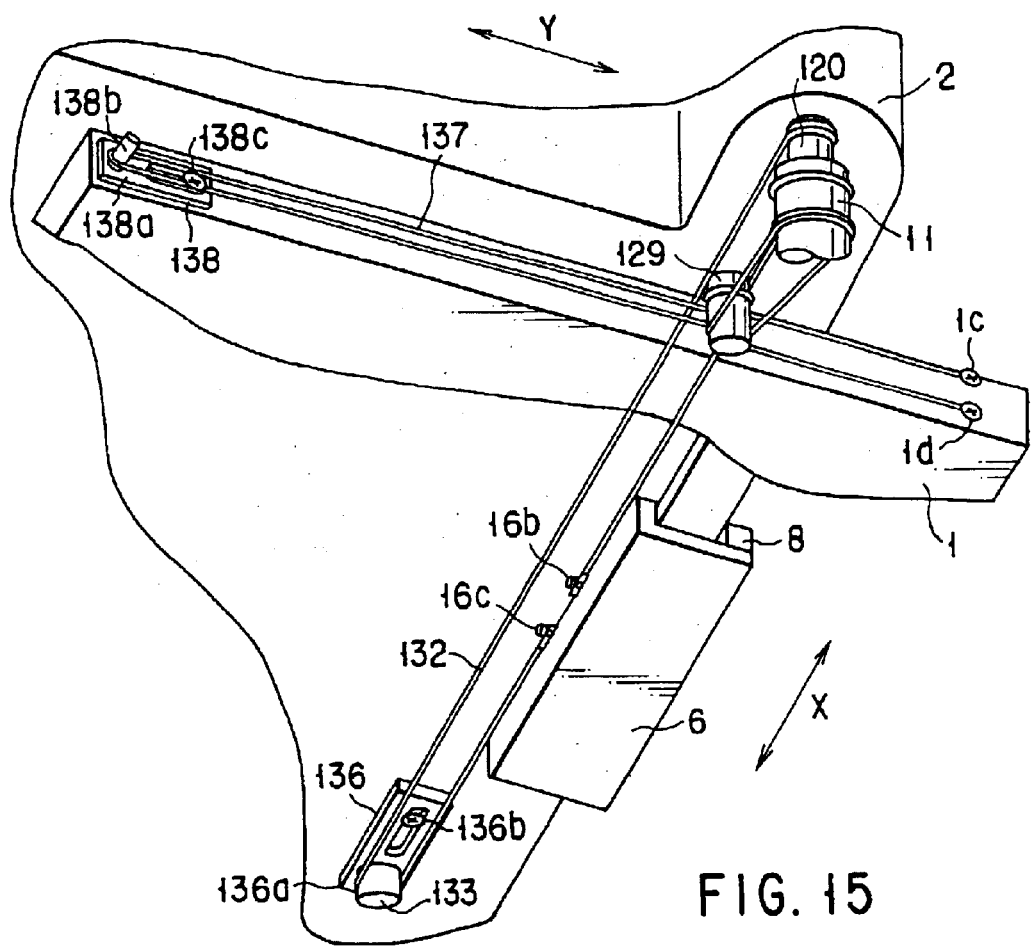
FIG. 15 is a simulated view showing a transmission mechanism of a linear member of the microscope stage according to the second embodiment of this invention.

FIG. 15 is a simulated view showing the transmission mechanism of the linear member. In FIG. 15, the same symbols are attached to the same portions of FIGS. 11 to 14 and FIGS. 1, 2. As described above, the microscope stage has the upper stage 2 and lower stage 1 vertically stacked to each other and the upper stage 2 is directly driven and guide and can be moved with respect to the lower stage 1.

The pulley 129 is rotatably mounted on the upper stage 2 and the Y handle shaft 11 is rotatably mounted in a position different from the pulley 129. Both end portions of the long and narrow linear member 137 are respectively hooked on the hook portions 1c, 1d and fixed. One end of the linear member 137 is hooked on the hook portion 1d and the linear member 137 is bent by the pulley 129 and wound on the pulley portion of the Y handle shaft 11 by one turn. Then, the linear member 137 is bent by the pulley 129 again and turned back at the pin 138b of the tension adjusting member 138 whose tension can be adjusted and which is disposed in a position in the moving direction different from the positions of the lower stage 1 where both ends are hooked. Further, the linear member 137 is wound on the pulley 129 by one turn and the other end portion is fixed on the hook portion 1c. The pulley 129 and Y handle shaft 11 are always tightened by the linear member 137 and the upper stage 2 can be moved with respect to the lower stage 1 by rotating the Y handle shaft 11.

On the other hand, the stage clip 9 is disposed on the upper side of the upper stage 2 and the stage clip 9 is fixed on the stage clip holding member 8. The stage clip holding member 8 is directly driven and guide with respect to the upper stage 2 via the guide mechanism. Both end portions of the long and narrow linear member 132 are respectively fixed on the hook portions 16b, 16c formed on the X guide member 6 and it is arranged to be stretched in the directly driving and guiding direction by the pulley 133 and X handle shaft 120. One end portion of the linear member 132 is hooked on the hook portion 16b and the linear member 132 is wound by one turn on the pulley portion of the X handle shaft 120 which is disposed coaxially with the Y handle shaft 11 rotatably mounted on the upper stage 2. Further, the linear member 132 is wound by half turn on the X pulley 133 rotatably supported by bearing on the upper stage 2 and the other end portion is hooked on the hook portion 16c. The linear member 132 is always stretched and the X handle shaft 120 is tightened by fixing and stretching the linear member 132 in a direction to separate the pulley 133 apart from the X handle shaft 120. Therefore, the X guide member 6, stage clip holding member 8 and stage clip 9 can be moved with respect to the upper stage 2 by rotating the X handle shaft 120.

Next, the operation of the microscope stage constructed as described above is explained. When it is desired to move the upper stage 2 in the Y direction with respect to the lower stage 1 fixed on the microscope main body, the operator operates and rotates the stage operating Y handle 12 by hand. If the Y handle 12 is rotated, the Y handle shaft 11 fixed on the Y handle 12 and the pulley portion 111a thereof are both rotated. Since the linear member 137 such as a wire rope is wound around the pulley portion 111a of the Y handle shaft 11, the wire rope 137 is continuously fed by rotation of the pulley portion 111a.

The continuously fed wire rope 137 is bent by the pulley 129 to change the direction thereof to the Y direction and moved. Since the pulley portion 111a of the Y handle shaft 11 is fixed on the upper stage 2 via the fixing shaft 110 and bearing, the guide member 5 fixed on the upper stage 2 and the guide groove portion 2a formed in the upper stage 2 are directly driven, guided and moved by the lower stage 1 and balls 4 according to the movement of the pulley portion 111a, and as a result, the upper stage 2 is moved in the Y direction.

Since the wire rope 137 is stretched by the tension adjusting member 138 to tighten the pulley portion 111a of the Y handle shaft 11, sufficiently large friction force occurs between the pulley portion 111a and the wire rope 137. Therefore, no slip occurs between the pulley portion 111a and the wire rope 137 at the time of rotation and it becomes possible to cause the upper stage 2 to follow the rotation amount of the pulley portion 111a and accurately move the same. The movement of the upper stage 2 is determined according to the rotating direction and rotation amount of the pulley portion 111a of the Y handle shaft 11.

The magnitude of torque of the pulley portion 111a is determined by friction force acting between the pulley portion 111a and the wire rope 137. In order to maintain high torque, the pulley portion 111a is subjected to a resistance process such as a blast process or rubber coating for enhancing the friction coefficient or enhancement of the tension for enhancing the tension of the wire rope 137 by the tension adjusting member 138 is effective. The resistance process for enhancing the friction coefficient is preferable, and since the Y handle shaft 11 falls when the tension is enhanced in the case of enhancement of tension and unbalanced load in the radial direction is applied to the bearing, a bad influence is given to smoothness of rotation. However, a certain degree of tension is required to move the stage by rotating the Y handle shaft 11.

The Y handle shaft 11 has the bearing 113 interposed on the upper stage 2 side with respect to the fixing shaft 110 fixed on the upper stage 2 and is formed into an engaging form on the Y handle 12 side and has a lubricant applied to the Y engaging portion 151. Thus, since a portion on which force acts in a direction perpendicular to the rotating axis of the Y handle shaft 11 by tension of the wire rope 137 is supported by the bearing 113, the Y handle 12 which smoothly rotates can be obtained. Therefore, the handle can be smoothly operated. The explanation is made for the Y handle 12, but the same explanation can be made for the X handle.

When it is desired to move the stage clip holding member 8 in the X direction with respect to the upper stage 2, the stage operating X handle 31 is rotated. If the stage operating X handle 31 is rotated, both of the X handle shaft 120 fixed on the X handle 31 and the pulley portion 120a thereof are rotated. If the pulley portion 120a is rotated, the linear member 132 such as a wire rope wound on the pulley portion 120a is fed according to the rotating direction of the pulley portion 120a, and as a result, the guide member 6 is pulled and moved by the linear member 132. Since the stage clip holding member 8 is fixedly mounted on the guide member 6, the guide member 6, stage clip holding member 8 and stage clip 9 fixed on the stage clip holding member 8 are moved in the X direction with respect to the upper stage 2.

Since the linear member 132 such as a wire rope is stretched by the X pulley 133 via the tension adjusting member 136 to tighten the pulley portion 120a of the X handle shaft 120, sufficiently large friction force occurs between the pulley portion 120a and the linear member 132, no slip occurs between the pulley portion 120a and the linear member 132 at the time of rotation and it becomes possible to cause the guide member 6 to follow the rotation amount of the pulley portion 120a and accurately move the same. The movement of the guide member 6 is determined according to the rotating direction and rotation amount of the pulley portion 120a. Further, the magnitude of torque of the pulley portion 120a and the rigidity of the transmission mechanism are the same as in the case of the Y direction.

When the handle mounted on the upper stage 2 is operated, the upper stage 2 is unconsciously pushed or pulled in the Y direction. Extension occurs in the linear member 137 of the transmission mechanism by an amount of the load added in connection with the behavior of the upper stage 2 by the handle operation. When the handle operation is terminated and his hold of the handle is released, the load on the linear member 137 is released to restore the linear member 137 to its original length. At this time, the upper stage 2 is interlocked and moved and the sample is stopped in a position deviated from the target position. Thus, as a factor associated with the stop precision of the stage, extension (rigidity) of the transmission mechanism, that is, the linear member 137 interconnecting the upper stage 2 and lower stage 1 is provided.

The linear member 137 (wire rope) has both ends hooked on the hook portions 1c, 1d of the lower stage 1 to make stepped portions and is turned back by the tension adjusting member 138 at substantially the mid portion of the linear member 137 (wire rope). The turned-back linear member 137 (wire rope) is wound on or turned back at the pulley 129. Thus, the upper stage 2 and the lower stage 1 are connected by substantially the two linear members (wire ropes), the load added at the time of handle operation is distributed onto the two wire ropes and the load for each line is reduced. Therefore, extension of the wire rope can be reduced and the positional deviation due to the extension can be halved and the stop precision can be enhanced.

Further, since the linear member 137 (wire rope) is turned back at the pin 138b by the tension adjusting member 138 for giving tension to the linear member 137 (wire rope), the load is substantially uniformly applied to the linear members 137 (wire ropes) which are turned back. If this example is dealt with as two steps, the load for each line can be further reduced by increasing the number of turn-backs of the wire rope to provide three steps or four steps by use of one wire rope. Turning back the wire rope by two or more steps and stretching the same is called multistep stretching.

In this example, the stage clip 9 and upper stage 2 act as loads for the driving mechanism in the Y direction, but in a three-stacked stage in which the moving member in the X direction is not the stage clip 9 and is constructed as a stage plate like the upper stage 2, the load of the driving mechanism is increased, and therefore, the multistep stretching of three steps or four steps becomes effective.

In order to reduce extension of the wire rope, a method for using a thick wire rope or fixing both ends of a plurality of wire ropes and interposing a pulley for each wire rope is provided. When a plurality of wire ropes are used, an adjusting mechanism for adjusting the loads or tensions of the wire ropes may be used. In the microscope, when the magnification of an objective lens is ×100, approx. several $\mu$m (micron meter) is required for the alignment precision, and therefore, extension of the wire rope gives an influence to observation. If the magnification of an objective lens is ×20 or less, the influence by extension of the wire rope becomes less and one wire rope can be practically used without turn-back.

Figure 16:
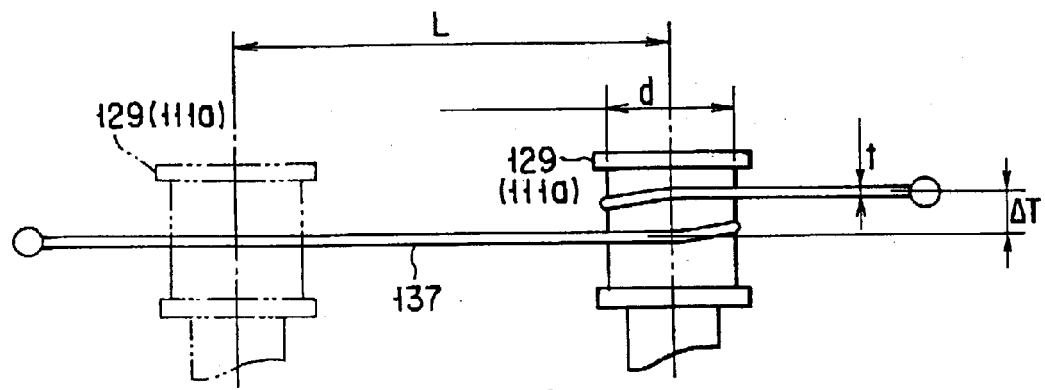
FIG. 16 is a simulated view showing a transmission mechanism using a linear member of the microscope stage according to the second embodiment of this invention.

FIG. 16 is a simulated view showing the transmission mechanism using the above-described linear member. As described above, the linear member 137 such as a wire rope is wound on the pulley 129 and the pulley portion 111a of the Y handle shaft 11 by one turn or plural turns, and if the handle is rotated, the linear member 137 relatively moves in the vertical direction (axial direction) with respect to the pulley 129 and pulley portion 111a. Therefore, in a case where the linear member 137 is wound on the pulley by plural turns and if a pitch amount $\Delta T$ is not provided for the linear member 137 as shown in FIG. 16 by taking not only the winding width of the linear member but also the movement amount of the linear member on the pulley into consideration, portions of the linear member 137 rub each other on the pulley, making it impossible to attain the smooth vertical movement and giving a bad influence to the movement of the stage. The pitch amount $\Delta T$ (an added amount of the winding width of the linear member and the movement amount thereof on the pulley) at this time is expressed by the following equation.

$$\Delta T = t[n + L/\{\pi(d+t)\}]$$

where t is a line diameter of the linear member 137 such as a wire rope, n is the number of turns of the linear member 137, L is a movement stroke of the stage and d is a pulley diameter. A pitch equal or larger than the pitch amount $\Delta T$ thus obtained is provided and the linear member 137 is wound to prevent portions of the linear member 137 from rubbing each other.

Further, in other embodiments and modifications, a stage having high stop precision, movement precision without rubbing of the linear member can be constructed by applying the above contents to a portion of the pulley on which the linear member is wound.

By constructing the microscope stage as described above, since the load for one wire rope can be reduced by supporting the wire rope used as the linear member which is the transmission member of the lower stage 1 and upper stage 2 as two lines obtained by turning back one linear member 137, the rigidity of the handle can be enhanced without applying tension which is so high that smooth rotation cannot be attained and preferable rotation feeling having viscosity can be attained by using a slide bearing on the operation handle shaft via a lubricant.

Figure 17:
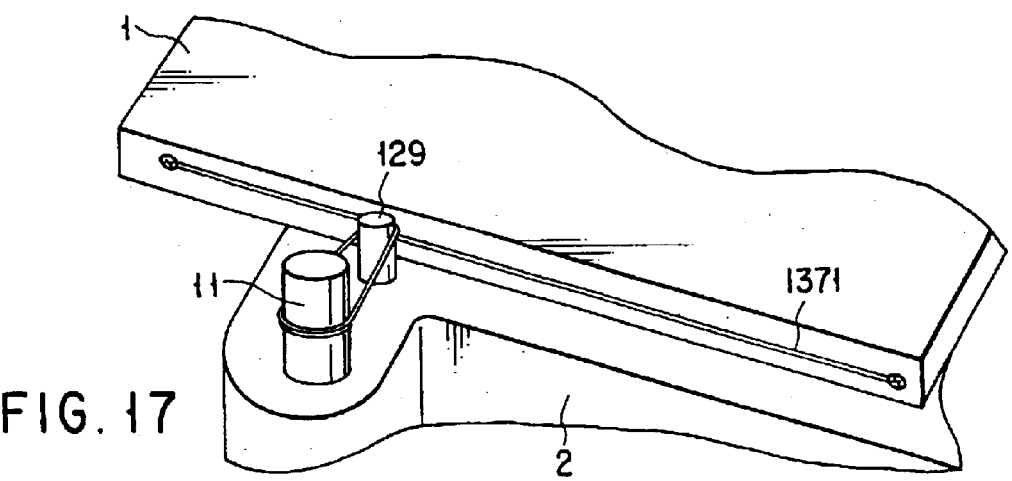
FIG. 17 is a simulated view showing an example of the transmission mechanism of the microscope stage according to the second embodiment of this invention.

FIG. 17 is a simulated view showing an example of the transmission mechanism for transmitting driving force via one wire rope without multistep stretching. In FIG. 17, the same symbols are attached to the same portions as those of FIG. 15. As described above, the microscope stage includes the upper stage 2 and lower stage 1 which are stacked in the vertical direction and the upper stage 2 can be directly driven, guided and moved with respect to the lower stage 1.

On the upper stage 2, the pulley 129 is rotatably mounted and the Y handle shaft 11 is rotatably mounted in a direction substantially perpendicular to the side of the lower stage 1. On the lower stage 1, both end portions of the long and narrow linear member 137 such as a wire rope are hooked and fixed. One end portion of the linear member 137 is hooked on the side of the lower stage 1, it is bent by the pulley 129, wound on the pulley portion of the Y handle shaft 11 by one turn and bent again by the pulley 129 and the other end portion thereof is hooked on the side of the lower stage 1.

In the conventional technique in Jap. Pat. Appln. KOKAI Publication No. 8-304708 described before, in a case where the position of the stage operating handle is set outside the stage, a problem that the lower stage and upper stage become large to give a bad influence to the operability of the surrounding portion of the stage can be solved by bending the linear member such as a wire rope by use of a pulley as shown in FIG. 17. Further, a problem of the stop precision for stably stopping the sample in a desired position can be solved by enhancing tension of the wire rope or using a wire rope having less extension (small spring constant).

However, if a construction is made to enhance the tension of the wire rope and bend the wire rope by use of the pulley, the handle shaft is pulled to the pulley side by the tension of the wire rope and falls and force in the radial direction is applied to the bearing of the handle shaft to make smooth rotation difficult. As a result, when the operation is performed to align the sample, the creak, stick slip or the like occurs to make the alignment of the sample difficult in some cases. When it is required to cope with such a problem, the problem can be solved by making the construction shown in FIGS. 11 to 15.

Figure 18:
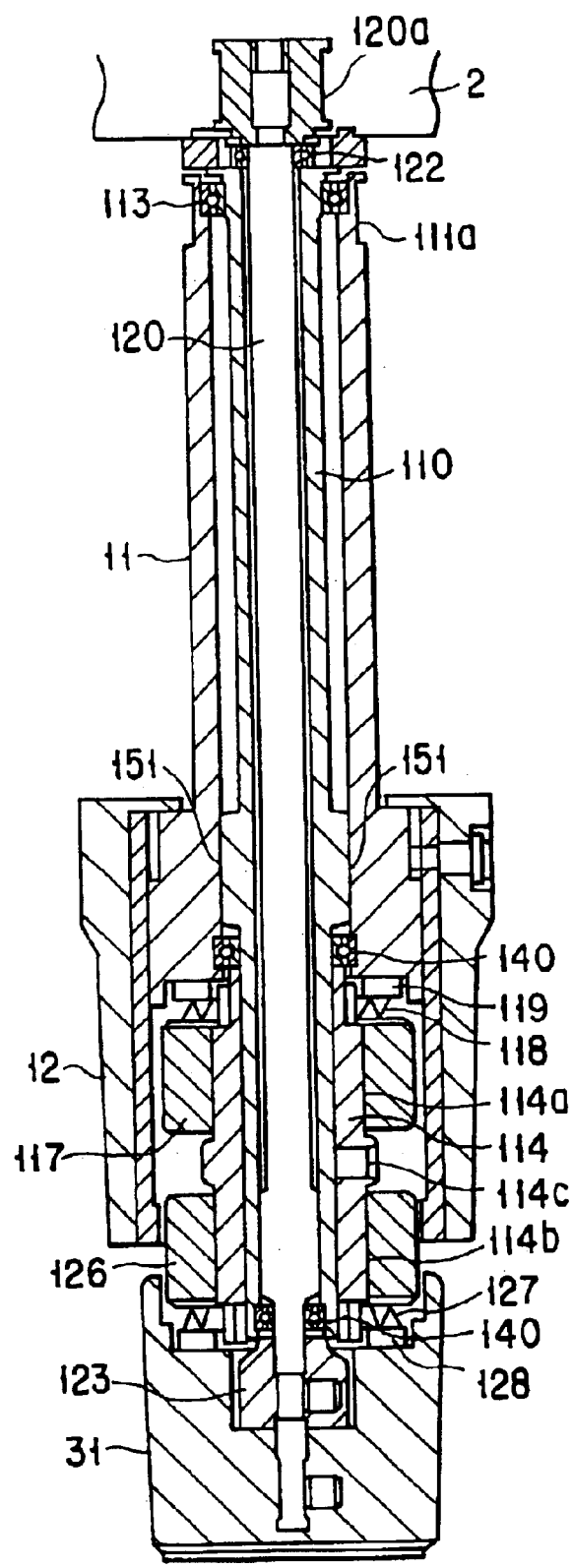
FIG. 18 is a cross sectional view showing a modification of the construction of the stage operating handle shown in the second embodiment of this invention.

FIG. 18 is a cross sectional view showing a modification of the construction of the stage operating handle shown in the second embodiment. In FIG. 18, the same symbols are attached to the same portions as those of FIG. 13. The difference in construction from the first embodiment is that both ends of the Y handle shaft 11 and X handle shaft 120 are held by rolling bearings 140, 140 such as bearings and a lubricant such as grease is applied to a portion around the fixing shaft 110 in the engaging portion of the X handle 31 and Y handle 12 to make the rotation feeling of both of the handle shafts 11, 120 preferable due to the viscosity thereof. The other construction is the same as that shown in FIG. 13.

Figure 19:
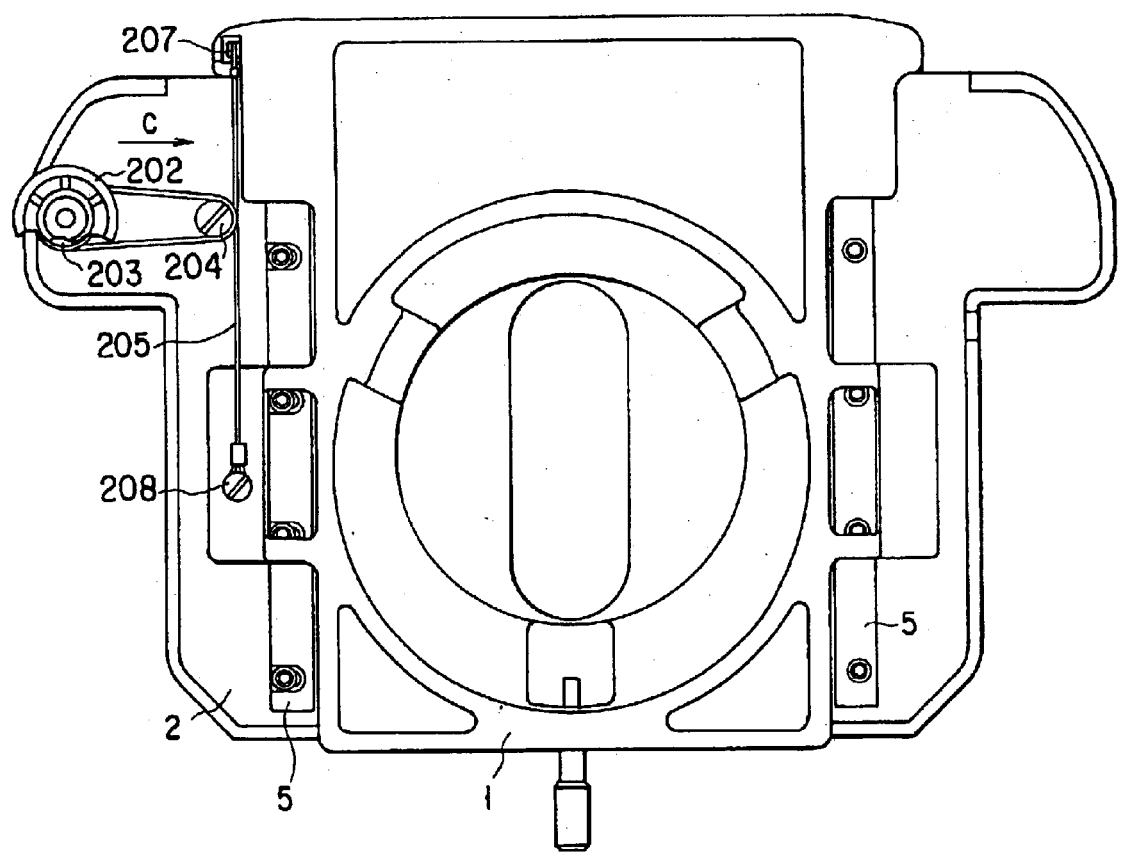
FIG. 19 is a schematic plan view of a wire-driven microscope stage according to a third embodiment of this invention as viewed from below.

FIG. 19 is a schematic plan view when viewing a wire-driven microscope stage according to a third embodiment of this invention from below. In FIG. 19, the same symbols are attached to the same portions as those of FIG. 1, FIG. 2.

In the construction of FIG. 19, it is featured that the upper stage 2 is driven by a wire and it is constructed such that the position of the stage is separated from the other operating portion and the position of an operating handle 202 is separated apart from the neighborhood of the right and left ends of the stage in order to enhance the operability. That is, the operating handle 202 having a first pulley 203 is set in an adequate position separated from the position of a second pulley 204 and one end of a wire 205 is fixed on a pin 207 planted on the lower stage 1.

Then, a construction is made such that the wire 205 is bent in a direction towards the operating handle 202 by the second pulley 204, wound on the first pulley 203 by one turn and turned back, bent by the second pulley 204 again, and the other end thereof is fixed on a pin 208 planted on the lower stage 1. The way of stretching the wire in FIG. 19 is the same as in the schematic perspective view of FIG. 17.

In the case of this construction, it is necessary to pay attention to tension of the wire. If tension is weak, the holding force of the upper stage 2 by the wire becomes weak when the upper stage 2 is stopped. Therefore, the upper stage 2 is unintentionally moved by slight movement of the hand or the like at the time of occurrence of subtle vibration or when the operating handle is operated, and there occurs a problem that the sample observing position is deviated or it cannot be adjusted to a position where it is desired to be observed. Further, there occurs a problem that the wire is expanded or contracted when the operating handle 202 is operated and the follow-up characteristic of the upper stage 2 is degraded.

If tension is strong, the operating handle 202 is pulled in a direction indicated by an arrow C in FIG. 19 and unbalanced load is applied to the bearing portion. Therefore, there occurs a problem that unnatural feeling (stiff feeling or rough feeling) occurs when the operating handle 202 is operated and the operation feeling becomes bad.

Figure 20:
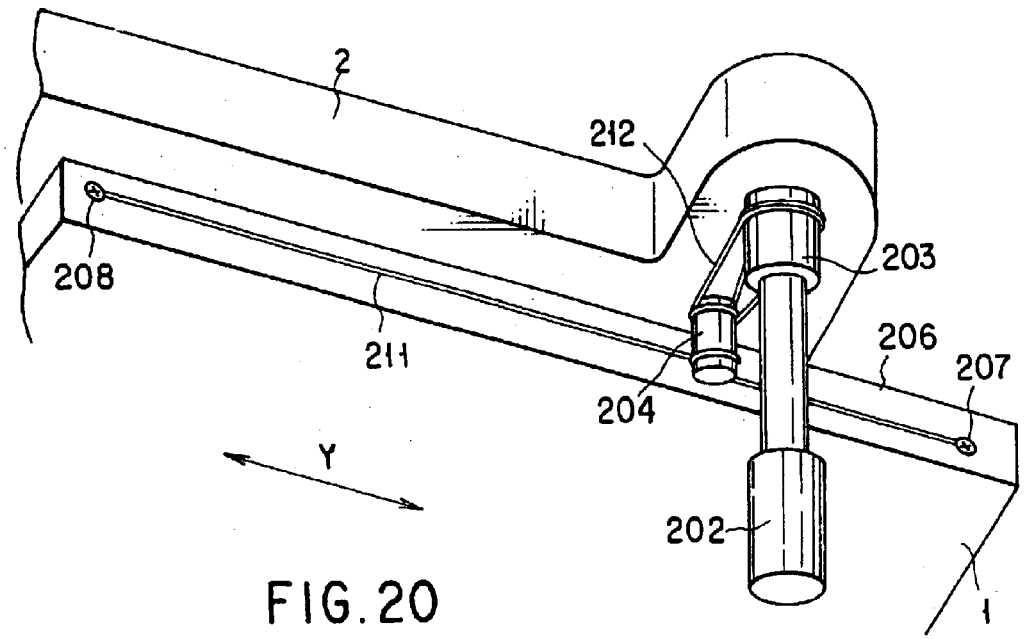
FIG. 20 is a schematic solid view of an example of the microscope stage according to the third embodiment of this invention as obliquely viewed from below.

FIG. 20 is a schematic solid view of an example of the microscope stage constructed to solve the above problems as obliquely viewed from below. In FIG. 20, the same symbols are attached to the same portions as those of FIG. 19. In FIG. 20, the wire is so formed as to be divided into two wires of a first wire 211 and second wire 212. The first wire 211 is stretched with strong tension and one end thereof is fixed on a pin 207 planted on the side surface of the lower stage 1. The first wire 211 is wound on a second pulley 204 by one turn and fixed on a pin 208 planted on the side surface of a lower stage 206.

The second wire 212 is formed in an annular form, stretched with tension weaker than that of the first wire 211, stretched over a first pulley 203 and second pulley 204 to interlock the first pulley 203 and the second pulley 204 with each other and wound on the second pulley 204 by one turn without making contact with the first wire 211.

With the above construction, a microscope stage in which the holding force at the time of stop of the upper stage 2 can be securely attained, the unbalanced load is not applied to the operating handle 202 and the operation feeling is good can be realized.

Figure 21:
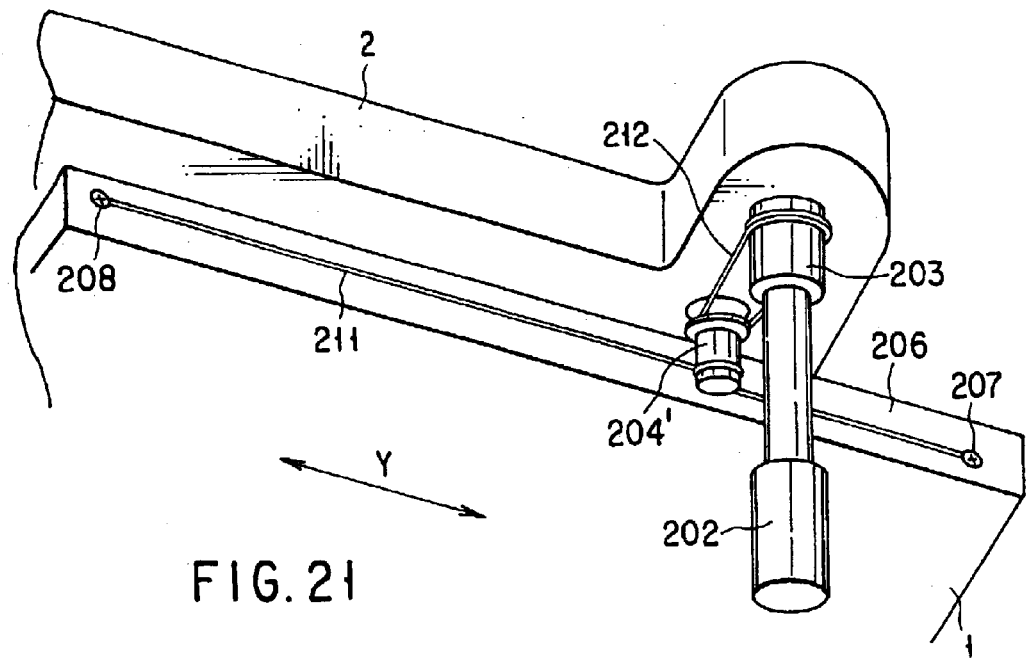
FIG. 21 is a schematic solid view of a microscope stage which is a modification of the third embodiment of this invention as obliquely viewed from below.

FIG. 21 is a schematic solid view of a microscope stage which is a modification of the third embodiment as obliquely viewed from below. In FIG. 21, the same symbols are attached to the same portions as those of FIG. 20. As shown in FIG. 21, the movement amount of the upper stage 2 with respect to the rotation amount of the operating handle 202 can be set to an optimum state by making a construction such that the diameters of portions of a second pulley 204' corresponding to the second pulley 204 over which a first wire 211 and second wire 212 are stretched are made different.

Figure 22:
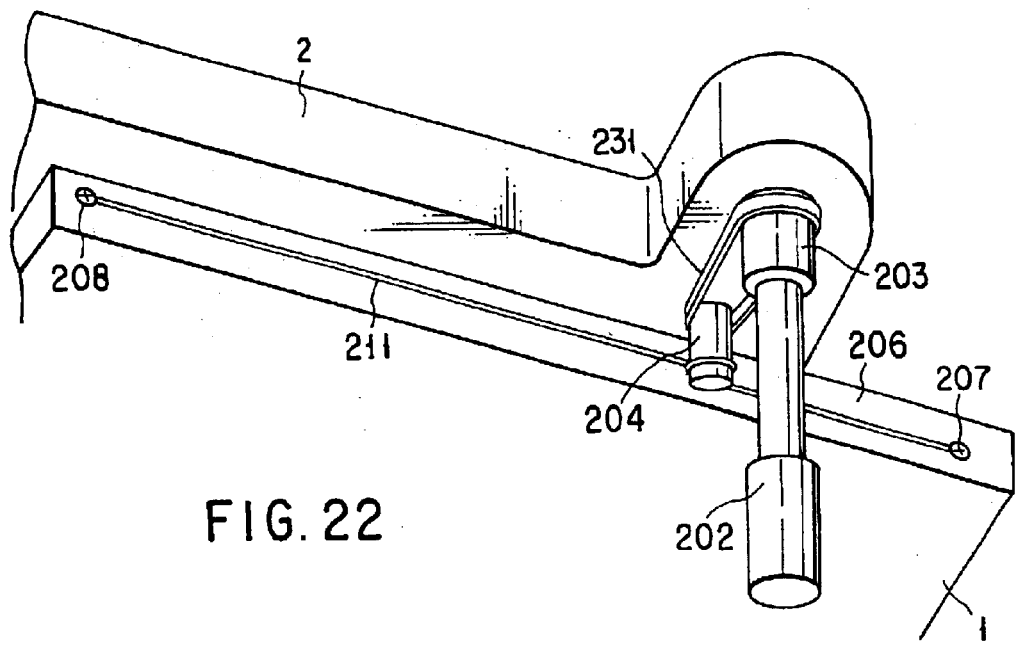
FIG. 22 is a schematic solid view of a microscope stage which is a modification of the third embodiment of this invention as obliquely viewed from below.

FIG. 22 is a schematic solid view of a microscope stage which is a modification of the third embodiment as obliquely viewed from below. In FIG. 22, the same symbols are attached to the same portions as those of FIG. 20. In FIG. 22, a timing belt 231 is used instead of the second wire 212 shown in FIG. 20 and stretched over the first pulley 203 and second pulley 204. As a result, the microscope stage can be assembled more easily than in a case where the second wire 212 is stretched over.

Alternatively, it is possible to provide gears which engage with each other on the first pulley 203 and second pulley 204.

Figure 23:
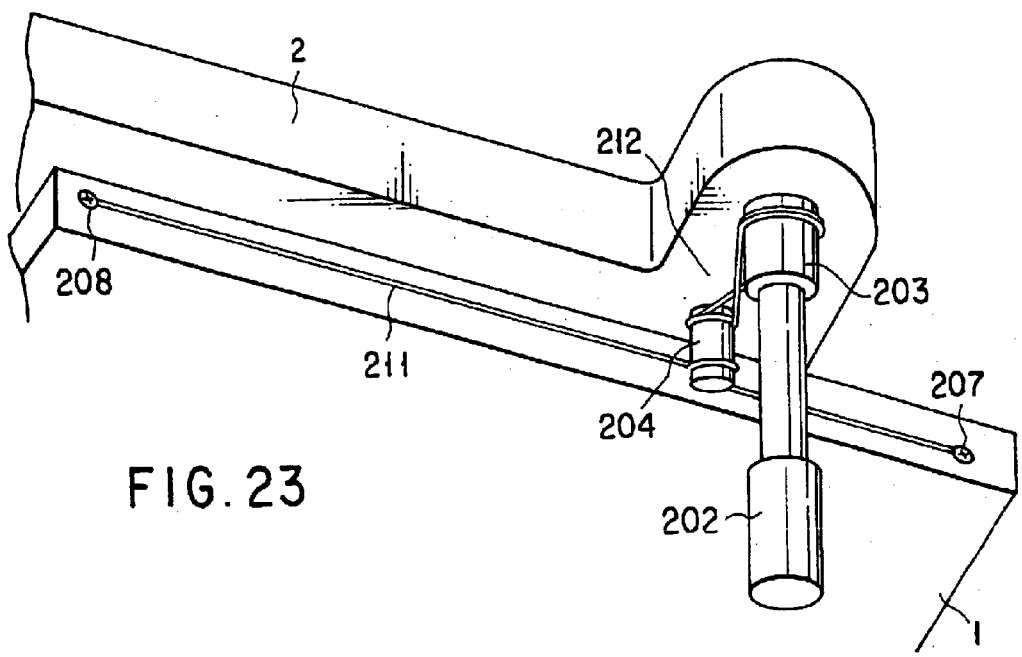
FIG. 23 is a schematic solid view of a microscope stage which is a modification of the third embodiment of this invention as obliquely viewed from below.

FIG. 23 is a schematic solid view of a microscope stage which is a modification of the third embodiment as obliquely viewed from below. In FIG. 23, the same symbols are attached to the same portions as those of FIG. 20. As shown in FIG. 23, the moving direction of the upper stage 2 for the rotating direction of the operating handle 202 can be reversed by stretching the second wire 212 over the first pulley 203 and the second pulley 204 to cross between them. As a result, the rotating direction of the operating handle and the moving direction of an observed image can be made coincident in an erected image type microscope.

Figure 24:
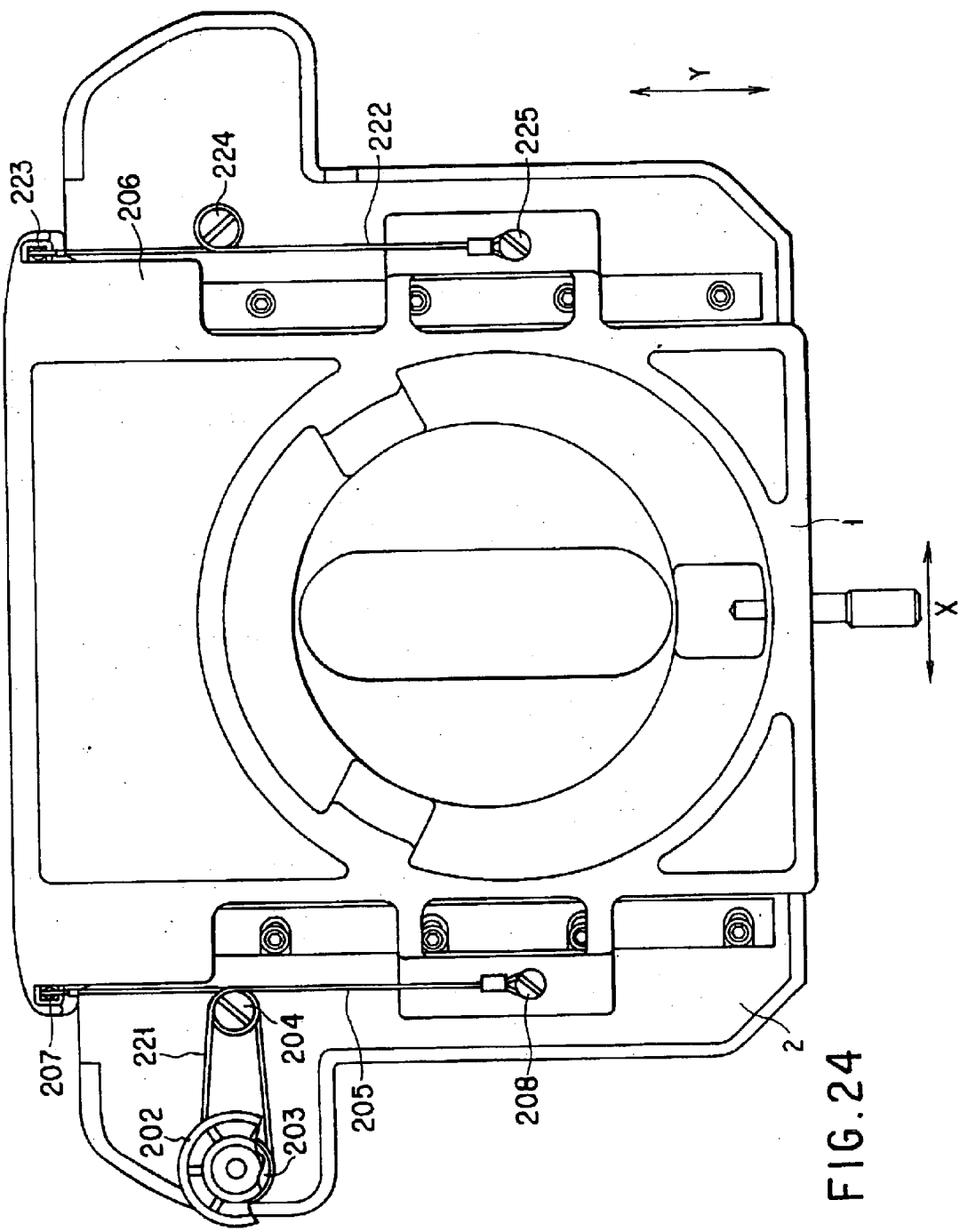
FIG. 24 is a schematic plan view of a microscope stage which is a modification of the third embodiment of this invention as viewed from below.

FIG. 24 is a schematic plan view of a microscope stage which is a modification of the third embodiment as viewed from below. In FIG. 24, the same symbols are attached to the same portions as those of FIG. 19.

In FIG. 24, a construction is made such that the wire is divided into a first wire 221 and second wire 222. The first wire 221 is stretched with tension which does not apply harmful unbalanced load to the operating handle 202 and one end thereof is fixed on a pin 207 planted on the side surface of the lower stage 1. Then, the first wire 221 is bent towards the operating handle 202 by the second pulley 204, wound on the first pulley 203 by one turn and turned back, bent by the second pulley 204 again and the other end thereof is fixed on a pin 208 planted on the side surface of the lower stage 1.

The second wire 222 is stretched with tension stronger than the first wire 221 and one end thereof is fixed on a pin 223 planted on the side surface of the lower stage 1. Then, the second wire 222 is wound on a third pulley 224 by one turn and the other end thereof is fixed on a pin 225 planted on the side surface of the lower stage 1.

Also, with the above construction, a microscope stage in which the holding force at the time of stop of the upper stage 2 can be securely attained, unbalanced load is not applied to the operating handle 202 and the operation feeling is good can be realized.

In the third embodiment, if the amount of rotating force of the operating handle 202 becomes excessively small when no unbalanced load is applied to the operating handle 202, the viscosity of rotation is lost and the creak, stick slip or the like occurs to make the operation feeling bad in some cases. However, the viscosity of rotation can be attained and the creak and stick slip at the time of operation can be eliminated by constructing a slide bearing portion by using the Y engaging portion 151 shown in FIG. 13 as the bearing portion of the operating handle and applying a lubricant to the surrounding portion thereof.

Further, as shown in FIG. 18, the operability of the operating handle can be further enhanced by making a construction such that the Y engaging portion 151 which is the slide bearing portion of the operating handle can be used together with the rolling bearing 140 such as a bearing.

As described above, according to the third embodiment, a wire-driven microscope stage in which the follow-up property of the movement of a sample and the operation feeling are good and the operability is good since the position of the operating handle is separated from the other operating portions can be provided.

Figure 25:
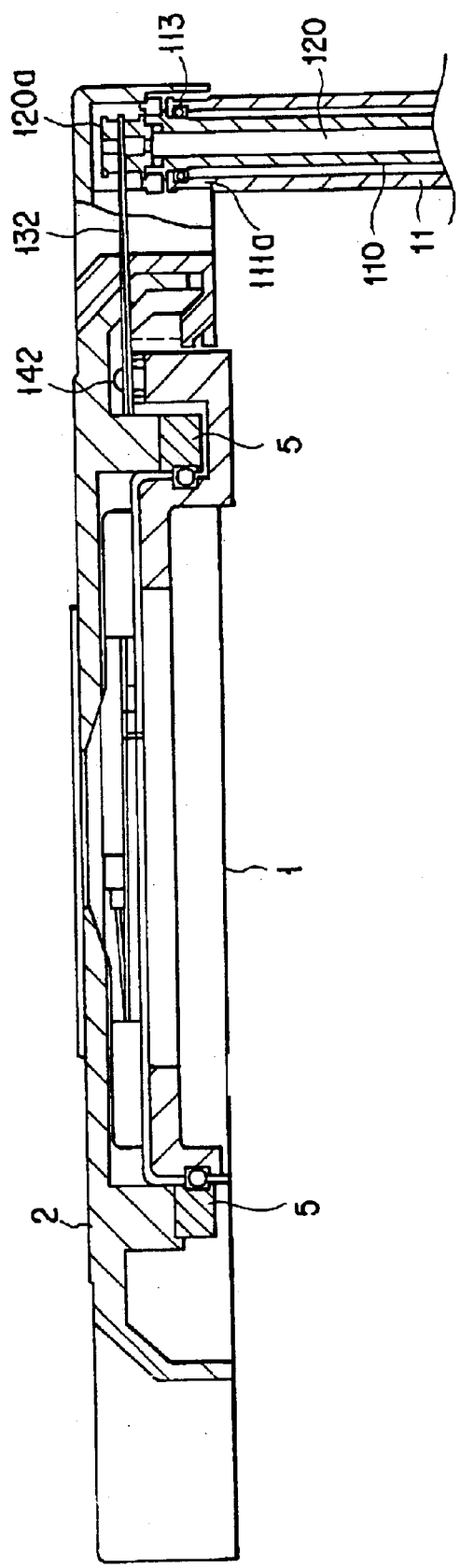
FIG. 25 is a cross sectional view showing the construction of a microscope stage according to a fourth embodiment of this invention.
Figure 26:
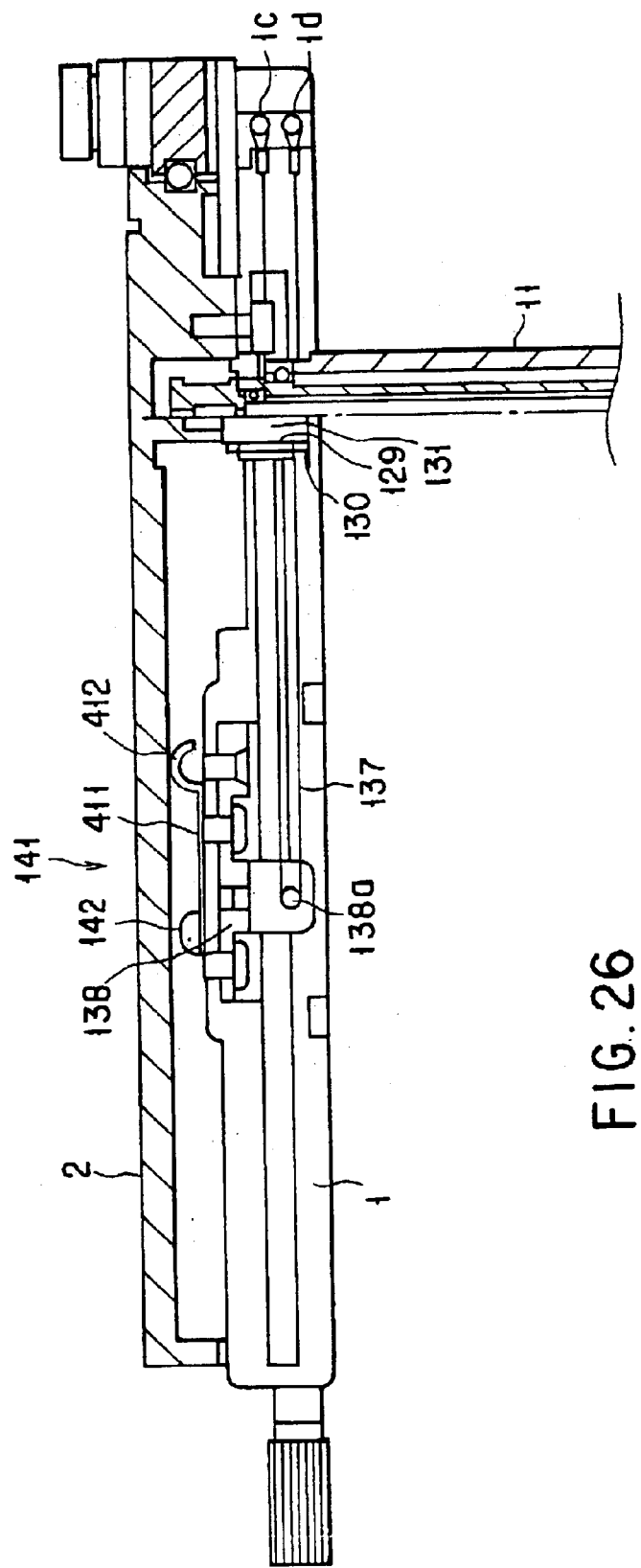
FIG. 26 is a cross sectional view showing the construction of the microscope stage according to the fourth embodiment of this invention.

FIGS. 25, 26 are cross sectional views showing the construction of a microscope stage according to a fourth embodiment of this invention. FIGS. 25, 26 respectively correspond to FIGS. 11, 12, and in FIGS. 25, 26, the same symbols are attached to the same portions as those of FIGS. 11, 12.

In FIGS. 25, 26, a brake member 141 is mounted on a tension adjusting member 138 of a lower stage 1 by a screw 142. The brake member 141 is formed of a rectangular flat plate 411, one end portion thereof constitutes a projecting portion 412, and the other end portion thereof is fixed on the tension adjusting member 138 by a screw 142. The projecting portion 412 is made contact with a rectangular protection member (not shown) and formed on the rear surface of an upper stage 2. Therefore, when the upper stage 2 is moved in the Y direction and stopped, the projecting portion 412 of the brake member 141 is made contact with the rear surface of the upper stage 2.

With the above construction, even if force (restoring force) for returning a linear member 137 in a direction opposite to the moving direction occurs when the upper stage 2 is moved and stopped, the upper stage 2 will not be returned in the opposite direction by friction force occurring between the projecting portion 412 and the protection member on the rear surface of the upper stage 2. Thus, the upper stage 2 can be more accurately stopped in a desired position in the Y direction. Likewise, the upper stage 2 can be more accurately stopped in a desired position in the X direction by providing the brake member 141 on the tension adjusting member 136.

Figure 27:
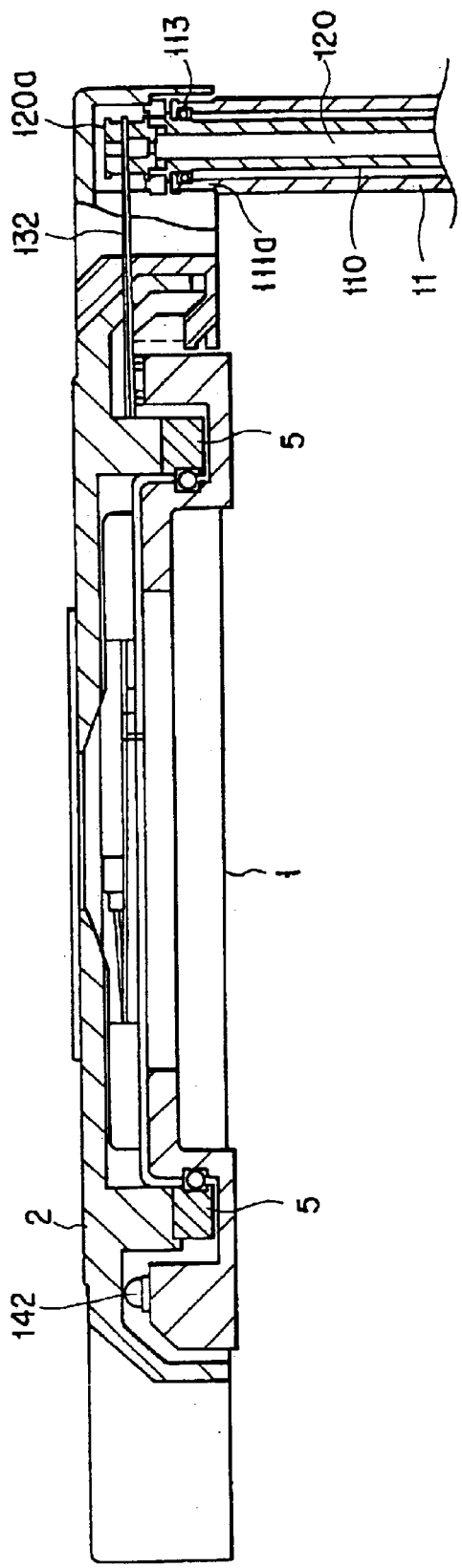
FIG. 27 is a cross sectional view showing the construction of a modification of the microscope stage shown in the fourth embodiment.

FIG. 27 is a cross sectional view showing the construction of a modification of the microscope stage shown in the fourth embodiment. In FIG. 27, the same symbols are attached to the same portions as those of FIG. 25. As shown in FIG. 27, the side end portion of the lower stage 1 extends to cross the guide member 5 and a brake member 141 may be mounted on the upper end portion thereof by a screw 142. Also, in this case, the brake member 141 is so mounted that the projecting portion 412 may be made contact with the rear surface of the upper stage 2 when the upper stage 2 is moved in the Y direction and stopped.

Figure 28:
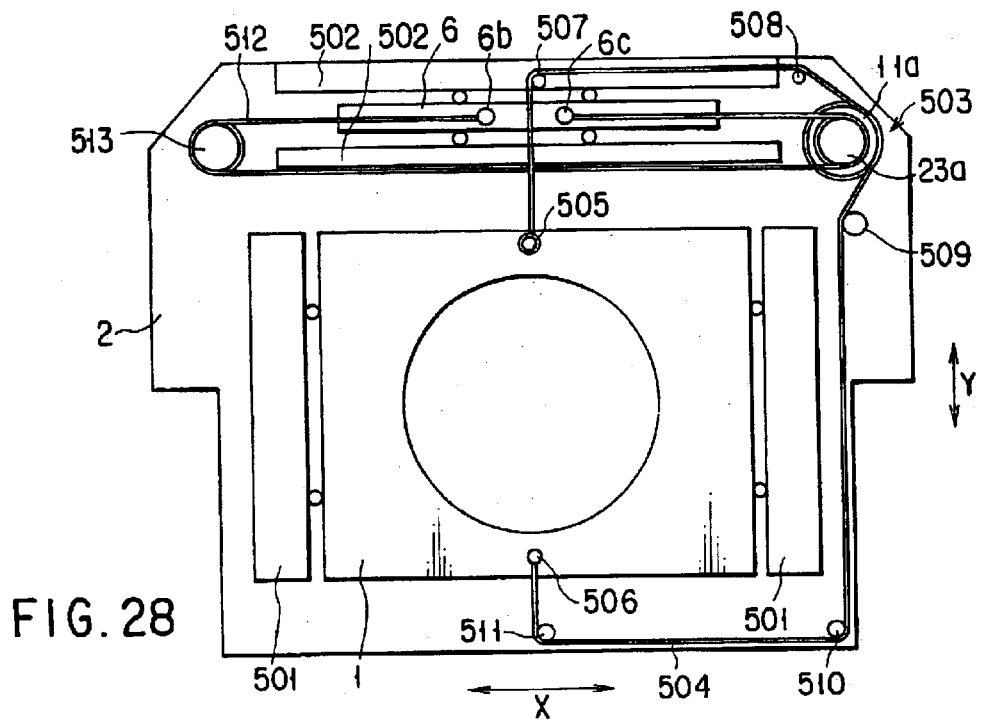
FIG. 28 is a bottom view of a microscope stage according to a fifth embodiment of this invention and showing the arrangement of a linear member.

FIG. 28 is a bottom view of a microscope stage according to a fifth embodiment of this invention and showing the arrangement of a linear member. In FIG. 28, the same symbols are attached to the same portions as those of FIGS. 1, 2, 8, 14 and others. The stage structure is basically the same as those shown in the first and second embodiments, but in FIG. 28, portions whose shapes or arrangements are different from the other drawings are provided (for example, the position of the handle mechanism portion having the pulley portion 11*a*, pulley portion 23*a* and the like) for convenience sake.

Direct driving guides 501, 501 are disposed on both end portions of the lower stage 1 which can be mounted on the microscope main body. The upper stage 2 is provided so as to be directly driven, guided and moved along the direct driving guides 501, 501. Further, on the upper stage 2, direct driving guides 502, 502 are disposed in a direction at right angles to the direct driving and guiding direction of the direct driving guides 501, 501. Further, on the upper stage 2, an X guide member 6 is provided so as to be directly driven, guided and moved along the direct driving guides 502, 502. On the X guide member 6, a stage clip 9 for holding a sample is fixed via a stage clip holding member 8.

Further, on the upper stage 2, a handle mechanism portion 503 including the Y handle shaft 11, Y handle 12, X handle 31 and the like is mounted. On the handle mechanism portion 50, the coaxially disposed pulley portion 11*a*, pulley portion 23*a* and the Y handle 12, X handle 31 are rotatably mounted with respect to the upper stage 2.

Next, the arrangement of a wire rope which is a linear member is explained.

In the Y direction, both end portions of a wire rope 504 are hooked on pins 505, 506 formed on the lower stage 1 between the pair of direct driving guides 501, 501 and fixed. The wire rope 504 has one end portion hooked on the pin 505 and it is stretched in a direction parallel to the guiding direction of the direct driving guides 501, 501 and is bent in the X direction by a pulley 507 rotatably disposed on the upper stage 2. Further, the wire rope 504 is rounded by a pulley 508 which is the same as the pulley 507 disposed on the upper stage 2 and wound on the pulley portion 11*a* of the handle mechanism portion 503 by one turn. Further, the wire rope 504 is rounded by a pulley 509 which is the same as the pulley 507 disposed on the upper stage 2 and bent in the X direction by a pulley 510 which is the same as the pulley 507 disposed on the upper stage 2. Further, the wire rope 504 is bent in the Y direction by a pulley 511 which is the same as the pulley 507 disposed on the upper stage 2 and the other end portion thereof is hooked on the pin 506 of the lower stage 1.

The pulleys 507, 511 are disposed in the central position of the upper stage 2 in the X direction. Further, the pins 505, 506 are disposed in the central position of the lower stage 1 in the X direction. That is, the pin 505 and pulley 507 and the pulley 511 and pin 506 are so disposed that the wire rope 504 stretched therebetween will be made parallel to the direct driving guides 501, 501.

In the X direction, like the Y direction, both end portions of a wire rope 512 are hooked on pins 6*b*, 6*c* formed on the X guide member 6 between the pair of direct driving guides 502, 502 and fixed. The wire rope 512 has one end portion hooked on the pin 6*b* and is stretched in a direction parallel to the guiding direction of the direct driving guides 502, 502, wound by one turn on a pulley 513 rotatably disposed on the upper stage 2 and the direction thereof is changed. Further, the wire rope 512 is wound on the pulley portion 23*a* of the handle mechanism portion 503 by one turn and the other end portion thereof is hooked on the pin 6*c* of the X guide member 6 after the direction is changed. At this time, the wire rope 512 whose direction is changed by the pulley portion 23*a* is made parallel to the direct driving guides 502, 502.

The treatment of the wire ropes 504, 512 may be attained by use of bending pulleys of several stages other than the above case. Further, in the above example, the wire ropes 504, 512 are wound by one turn on the pulley portion 11*a* and pulley portion 23*a* of the handle mechanism portion 503, but it is possible to wind them by several (plural) turns.

Figures 29A, 29B:
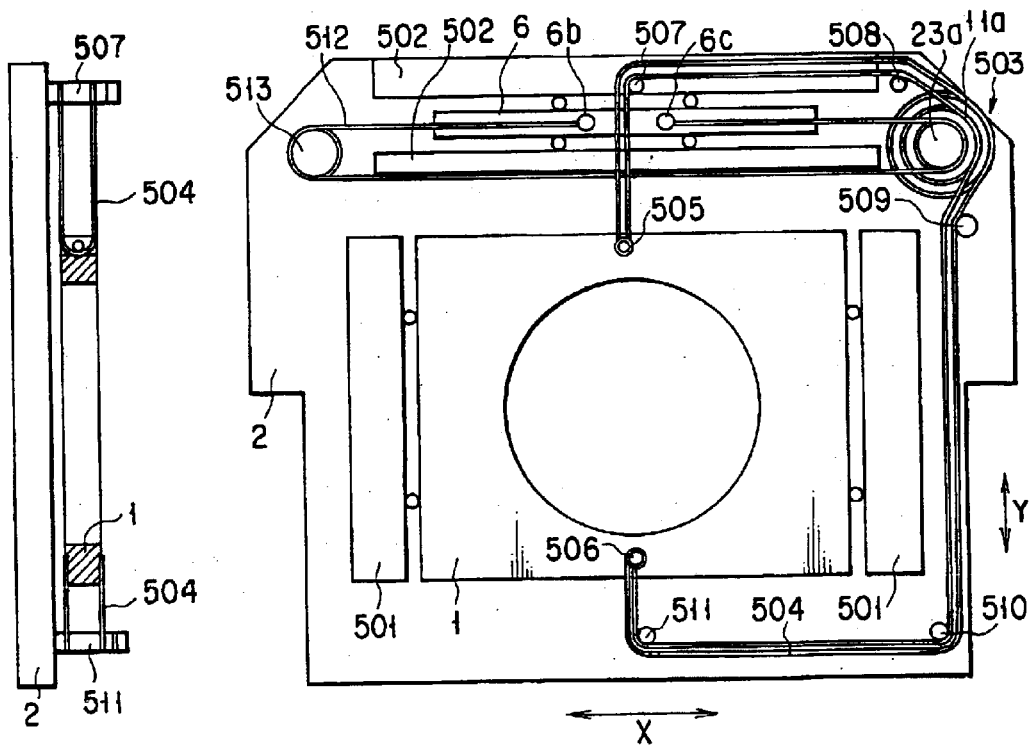
FIG. 29A is a bottom view of a microscope stage according to a modification of the fifth embodiment of this invention.
FIG. 29B is a side cross sectional view of a microscope stage according to a modification of the fifth embodiment of this invention.

FIG. 29A is a bottom view of a microscope stage according to a modification of the fifth embodiment and FIG. 29B is a side cross sectional view thereof showing the arrangement of a linear member. In FIGS. 29A, 29B, the same symbols are attached to the same portions as those of FIG. 28.

In FIGS. 29A, 29B, an example in which the Y direction driving wire rope 504 shown in FIG. 28 is stretched to go and return by one time is shown. That is, in the Y direction, the wire rope 504 has one end portion hooked on the pin 506 and is stretched in parallel to the guiding direction of the directly driving guides 501, 501 and bent in the X direction by the pulley 511. Further, the wire rope 504 is bent in the Y direction by the pulley 510, rounded by the pulley 509 and wound by one turn on the pulley portion 11*a* of the handle mechanism portion 503. Further, the wire rope 504 is rounded by the pulley 508, bent in the Y direction by the pulley 507, wound by half turn on the pin 505 and turned back.

Then, the wire rope 504 is wound by one turn on the pulley portion 11*a* via the pulleys 507, 508 and the one end portion is hooked on the pin 506 via the pulleys 509, 510, 511. In this case, in each pulley, portions of the wire rope 504 of the outward path and returning path are stretched on different steps so as not to interfere with each other.

Thus, in this modification, an example in which the wire rope 504 stretched as shown in FIG. 28 is arranged to return to the original wire rope fixing position of the lower stage 1 via the same path again is shown and the wire rope 504 stretched in the back and forth direction (Y direction) of the lower stage 1 is arranged in parallel to the direct driving guides 501, 504 in either case.

Figures 30A, 30B:
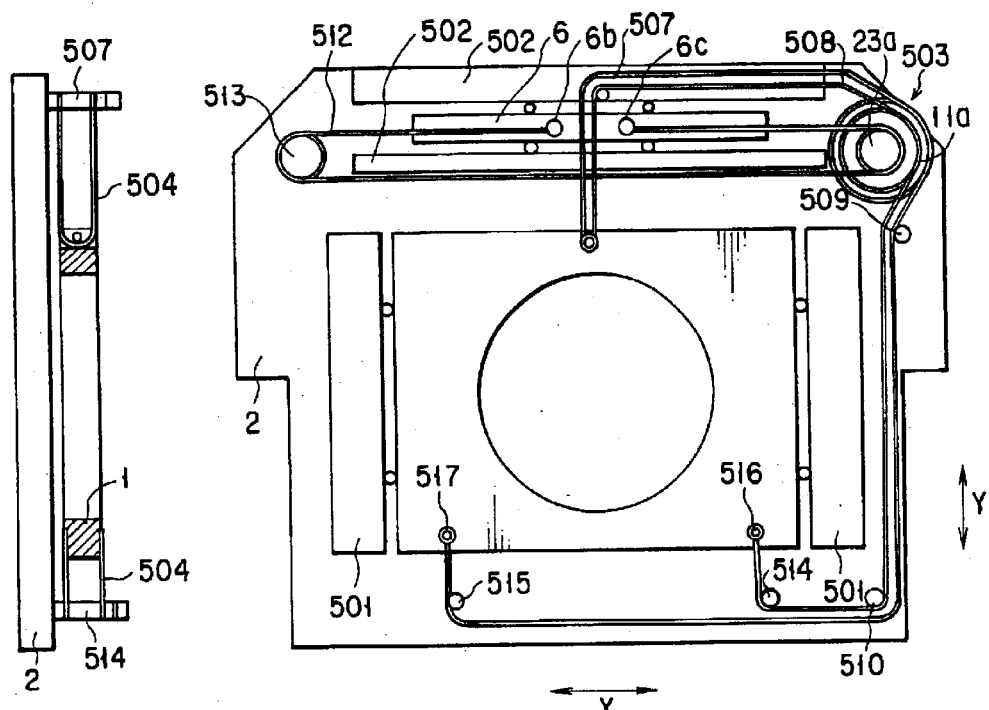
FIG. 30A is a bottom view of a microscope stage according to a modification of the fifth embodiment of this invention.
FIG. 30B is a side cross sectional view of a microscope stage according to a modification of the fifth embodiment of this invention.

FIG. 30A is a bottom view of a microscope stage according to a modification of the fifth embodiment, FIG. 30B is a side cross sectional view thereof and is a view showing the arrangement of a linear member. In FIGS. 30A, 30B, the same symbols are attached to the same portions as those of FIG. 28.

In FIGS. 30A, 30B, the connecting position of the Y direction driving wire rope 504 shown in FIG. 28 is not limited to the center of the lower stage 1 and is set to two positions which are uniformly shifted from the central position. As shown in FIG. 5, the two pulleys 514, 515 are disposed in positions at a uniform distance in the X direction from the central position on the upper stage 2 and two pins 516, 517 are disposed in positions at a uniform distance in the X direction from the central position on the lower stage 1.

The wire rope 504 has one end portion hooked on the pin 516 and is stretched in a direction parallel to the guiding direction of the direct driving guides 501, 501 and wound by one turn on the pulley portion 11*a* via the pulleys 514, 510, 509. Further, the wire rope 504 is wound by half turn on the pin 505 via the pulleys 508, 507 and turned back.

Then, the wire rope 504 is wound by one turn on the pulley portion 11*a* via the pulleys 507, 508 again and bent in a direction parallel to the guiding direction of the direct driving guides 501, 501 by the pulley 515 via the pulleys 509, 510, 514, and the other end portion thereof is hooked on the pin 517. In each pulley, the wire ropes 504, 504 are stretched on different steps so as not to interfere with each other.

Thus, in this modification, the connecting position of the wire rope is not limited to the center of the stage and is set to two positions which are uniformly shifted from the central position. In this case, forces caused by the wire rope are synchronized and a thrust and unbalanced load occurring in the direct driving guides 501, 501 are eliminated by uniformly holding the relation between the two connecting positions. In the above description, an example in which one wire rope is used is shown, but the same effect can be attained by using a large number of wire ropes and synchronizing the tensions thereof.

In the structures shown in the first to fourth embodiments, it is necessary to enhance friction force between the wire rope and the pulley of the handle portion and enhance the tension of the wire rope in order to enhance the transmission force of the wire rope. As a result, if the tension of the wire rope is enhanced in the X and Y directions, the wire rope will directly pull the member supported by the direct driving guide.

On the other hand, in the fifth embodiment, the connecting position of the wire rope and the guide moving member (X guide and lower stage) is set in the neighborhood of the center of the pair of direct driving guides or set to balance the tensions in each of the X and Y directions. Further, the thrust and unbalanced load of the guides can be eliminated by arranging the wire rope in a direction parallel to the direct driving guide direction in the Y direction, applying the combined force of tensions to the neighborhood of the center of the lower stage and connecting the wire rope to the handle mechanism by use of the pulley or the like.

Figure 31:
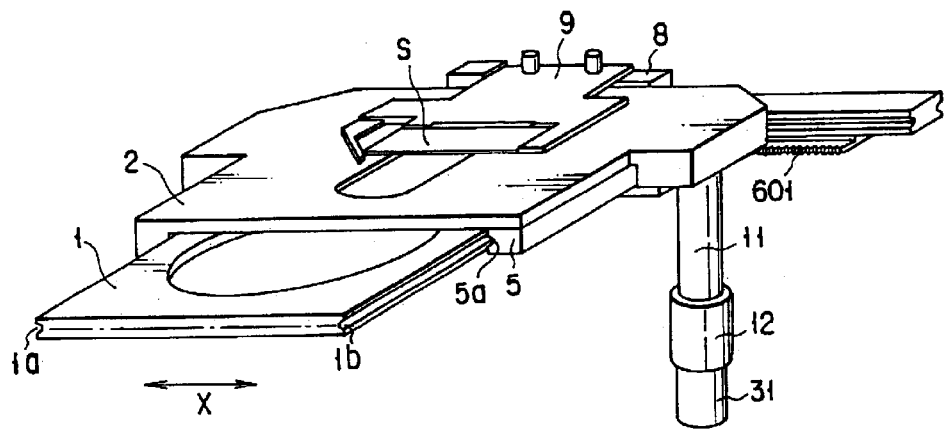
FIG. 31 is a perspective view showing a modification of the microscope stage shown in each embodiment of this invention.

FIG. 31 is a perspective view of a modification of the microscope stage shown in each of the above embodiments. In FIG. 31, the same symbols are attached to the same portions as those of FIG. 1. As described above, the stage structure is divided into the stage guide mechanism portion and handle mechanism portion, and the transmission mechanism portion for transmission of force of the stage guide mechanism portion and handle mechanism portion. In each of the above embodiments, the stage guide mechanism portion and handle portion are explained by use of the pulleys and linear member.

However, as shown in FIG. 31, the same effect can be attained by providing a rack 601 or the like in the transmission mechanism portion and using a rack and pinion driving system using the pinion instead of the pulley portion of the handle shaft.

According to the microscope stage of this invention, the driving force transmitting members will not rub each other on the pulley and handle portion. If portions of the driving force transmitting member which are wound on the pulley or handle portion are brought into contact with and rub each other, a bad influence is given to the moving precision of the stage. The driving force transmitting member moves in the axial direction on the pulley according to the movement of the upper stage and wear of the driving force transmitting member can be prevented over the whole stroke by winding the driving force transmitting member on preset stepped portions so that the driving force transmitting member will not rub each other in the entire range of the moving stroke.

According to the microscope stage of this invention, portions of the driving force transmitting member will not rub each other on the pulley, and the driving force transmitting member is smoothly moved on the pulley in the axial direction and the movement of the stage becomes preferable.

According to the microscope stage of this invention, a pulley disposed in a position in which the outside diameter portion thereof is substantially made contact with a portion of the linear driving force transmitting member which is stretched along the movement direction of the upper stage is provided. The handle portion can be freely disposed in a position apart from the driving force transmitting member with respect to the pulley. Therefore, the handle portion can be disposed in a position in which the operation can be easily effected by taking the operability of the stage into consideration.

According to the microscope stage of this invention, smooth rotation can be attained by use of a combination of the rolling bearing and slide bearing even if unbalanced load due to tension of the driving force transmitting member acts and preferable operation feeling having the viscosity for the handle can be attained by use of a lubricant on the slide bearing portion.

According to the microscope stage of this invention, since load applied to the driving force transmitting member is reduced by stretching the driving force transmitting member while it is bent by plural times by multistep stretching, extension thereof is suppressed and the rigidity of the transmission mechanism is enhanced and the stop precision of the stage is enhanced.

According to the microscope stage of this invention, the role of the driving force transmitting member can be divided into the object for enhancing the rigidity of the transmission mechanism and the object for realizing preferable operation feeling of the handle by using two driving force transmitting members and the preferable stop precision due to the rigidity of the transmission mechanism and the preferable operation feeling of the handle can be made compatible.

According to the microscope stage of this invention, the rigidity of the transmission mechanism can be enhanced by strengthening the tension of the first driving force transmitting member, the unbalanced load applied to the handle portion is reduced by weakening the tension of the second driving force transmitting member, and smooth rotation of the handle can be attained.

According to the microscope stage of this invention, since resistance force is given to the linear movement of the upper stage by use of the brake mechanism, the upper stage can be securely stopped when the handle operation is interrupted and thus the stage stopping precision is enhanced.

According to the microscope stage of this invention, resistance force is given to the linear movement of the stage by friction force occurring between the friction member and the stage and the stage can be securely stopped when the handle operation is interrupted.

According to the microscope stage of this invention, resistance force is given to the linear movement of the upper stage by giving resistance force to the rotation of the handle and the upper stage can be securely stopped when the handle operation is interrupted.

According to the handle mechanism of the microscope stage of this invention, the elastic member disposed on the guide as in the conventional case is omitted and the amount of handle rotating force free from irregularity can be attained with always stable stop precision and light operation feeling by use of less members.

According to the microscope stage of this invention, since the casing for guiding the stage is formed of one member formed in the "⊐" shape, no deviation occurs in the casings of the right and left grooves with time and a reduction and the like in the movement stroke can be prevented.

As described above, according to this invention, a microscope stage can be provided which has a simple construction using inexpensive members and in which attainment of high alignment precision, preferable movement follow-up property, operation feeling as the microscope stage and enhancement of the degree of freedom of the arrangement of the stage operating handle can be made compatible.

Further, according to this invention, a microscope stage can be provided in which the handle operation can be effected with light rotating force, stable stop precision can be attained and the handle rotating force is free from irregularity.

Further, according to this invention, a microscope stage can be provided which can prevent occurrence of force such as a thrust and unbalanced load in the guide mechanism when the tension of the driving force transmitting member is enhanced, can smoothly move and has high rigidity to enhance the tension with high stop precision and preferable feeling.

This invention is not limited only to the above embodiments and can be variously modified and effected without departing from the technical scope thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope stage comprising:

a lower stage, an upper stage linearly movably supported in a Y direction with respect to said lower stage;

an X guide member linearly movably supported in an X direction which is orthogonal to said Y direction with respect to said upper stage;

a handle rotatably supported on said upper stage and having an X pulley portion and a Y pulley portion that are rotatable about the same rotation axis;

a Y pulley rotatably supported at a position apart from said handle in a direction different from said Y direction and parallel to an XY plane which includes the X direction and the Y direction;

a Y direction-driving linear member stretched along the Y direction two points of said Y direction-driving linear member being immovably fixed relative to the lower stage, and wound on said Y pulley and said Y pulley portion of the handle;

an X pulley rotatably supported at a position on the upper stage that is apart from the handle in the X direction; and an X direction-driving linear member wound on said X pulley and said X pulley portion of the handle, and fixed on said X guide member.

2. The microscope stage according to claim 1, wherein the Y pulley is disposed such that an outer circumference thereof is in contact with a portion of said Y direction-driving linear member that is stretched in the Y direction.

3. The microscope stage according to claim 2, wherein said handle is disposed at a position apart from said Y pulley in the X direction.

4. The microscope stage according to claim 1, wherein the Y direction-driving linear member comprises a wire.

5. The microscope stage according to claim 1, wherein the Y direction-driving linear member comprises:

a first wire, two points of which are immovably fixed to said lower stage, and wound on said Y pulley; and a second wire or belt which rotatably connects said Y pulley and said handle.

6. A method for driving an XY stage for a microscope comprising:

stretching a Y direction linear member in a Y direction and fixing two points thereof to a lower stage;

rotatably disposing, a Y pulley on an upper stage movable in the Y direction, and winding the Y direction linear member around the Y pulley;

connecting an X movement member to an X direction linear member movable relative to said upper stage in an X direction orthogonal to the Y direction;

operating an X handle, to move the X direction linear member, thereby moving the X movement member in the X direction; and operating a Y handle disposed at a position apart from the Y pulley in a direction different from the Y direction and parallel to an XY plane, to rotate the Y pulley, thereby moving the Y pulley in the Y direction and moving the upper stage in the Y direction.

7. The method according to claim 6, wherein the X handle and the Y handle are coaxial.

* * * * *